US012429425B2

(12) United States Patent
Semrau

(10) Patent No.: US 12,429,425 B2
(45) Date of Patent: Sep. 30, 2025

(54) COMPRESSIVE RAMAN CLASSIFICATION OF CELLS USING A NEURAL NETWORK FOR OPTICAL FILTER DESIGN AND CELL CLASSIFICATION

(71) Applicant: Universiteit Leiden, Leiden (NL)

(72) Inventor: Stefan Semrau, New York, NY (US)

(73) Assignee: UNIVERSITEIT LEIDEN, Leiden (NL)

( * ) Notice: Subject to any disclaimer, the term of this patent is extended or adjusted under 35 U.S.C. 154(b) by 126 days.

(21) Appl. No.: 18/119,621

(22) Filed: Mar. 9, 2023

(65) Prior Publication Data

US 2024/0302283 A1    Sep. 12, 2024

(51) Int. Cl.
*G01N 21/65*    (2006.01)
*G01N 15/10*    (2024.01)
(Continued)

(52) U.S. Cl.
CPC .......... *G01N 21/65* (2013.01); *G02B 21/367* (2013.01); *G02B 26/0833* (2013.01);
(Continued)

(58) Field of Classification Search
CPC ......... G01N 21/65; G01N 2201/06113; G01N 2015/1006; G01N 15/1434; G01N 2201/0675; G01N 15/1429; G01N 2201/1296; G02B 26/0833; G02B 21/367; G06N 3/0675; G06N 3/045; G06N 3/02; G06V 10/764; G06V 10/82; G06V 20/693; G06V 20/698
(Continued)

(56) References Cited

U.S. PATENT DOCUMENTS

2018/0088113 A1*   3/2018  Boss ................. G01N 15/1456
2018/0128748 A1*   5/2018  Hirai ................... G02B 21/008
(Continued)

FOREIGN PATENT DOCUMENTS

CN        104458696 A  *  3/2015

OTHER PUBLICATIONS

Akagi et al., Non-invasive cell classification using the Paint Raman Express Spectroscopy System. Scientific Reports vol. 11, Article No. 8818 (2021).
(Continued)

*Primary Examiner* — Tarifur R Chowdhury
*Assistant Examiner* — Kaitlyn E Kidwell
(74) *Attorney, Agent, or Firm* — NIXON PEABODY LLP; Ronald I. Eisenstein; Nicole D. Kling

(57) ABSTRACT

A method for cell classification performs a compressive Raman measurement of a cell sample that involves frequency filtering the dispersed optical signal by a tunable optical filter whose frequency response is defined by weights that were derived from trained weights of a first hidden layer of a neural network trained on Raman spectra of cells and corresponding labels. The frequency filtered signals are detected by an optical detector to produce a compressive Raman measurement. Multiple compressive Raman measurements are then input to a prediction neural network to predict a label of the cell sample. The prediction neural network is the same as the trained neural network except without the input layer and the weights of the first hidden layer.

12 Claims, 25 Drawing Sheets

(51) Int. Cl.

| | |
|---|---|
| *G01N 15/1429* | (2024.01) |
| *G01N 15/1434* | (2024.01) |
| *G02B 21/36* | (2006.01) |
| *G02B 26/08* | (2006.01) |
| *G06N 3/02* | (2006.01) |
| *G06N 3/045* | (2023.01) |
| *G06N 3/067* | (2006.01) |
| *G06V 10/764* | (2022.01) |
| *G06V 10/82* | (2022.01) |
| *G06V 20/69* | (2022.01) |

(52) U.S. Cl.
CPC ... *G06N 3/0675* (2013.01); *G01N 2015/1006* (2013.01); *G01N 15/1429* (2013.01); *G01N 15/1434* (2013.01); *G01N 2201/06113* (2013.01); *G01N 2201/0675* (2013.01); *G01N 2201/1296* (2013.01); *G06N 3/02* (2013.01); *G06N 3/045* (2023.01); *G06V 10/764* (2022.01); *G06V 10/82* (2022.01); *G06V 20/693* (2022.01); *G06V 20/698* (2022.01)

(58) Field of Classification Search
USPC .......................................................... 356/301
See application file for complete search history.

(56) References Cited

U.S. PATENT DOCUMENTS

| | | | | |
|---|---|---|---|---|
| 2019/0019100 | A1* | 1/2019 | Roques-Carmes | G06N 3/084 |
| 2020/0116564 | A1* | 4/2020 | Goldring | G01J 3/0275 |
| 2022/0057263 | A1* | 2/2022 | Kersey | G01J 3/44 |
| 2022/0087532 | A1* | 3/2022 | Freudiger | G06V 20/69 |

OTHER PUBLICATIONS

Kazemzadeh et al. Deep convolutional neural networks as a unified solution for Raman spectroscopy-based classification in biomedical applications. Optics Communications vol. 510, May 1, 2022, 127977.

Liu et al., Deep Convolutional Neural Networks for Raman Spectrum Recognition : A Unified Solution. arXiv:1708.09022v1 [cs.LG] Aug. 18, 2017.

Luo et al., Deep Learning for Raman Spectroscopy: A Review. Analytica 2022, 3(3), 287-301. Jul. 2022.

Kim et al. Compressive Sensing Spectroscopy Using a Residual Convolutional Neural Network. Sensors 2020, 20(3), 594. Jan. 2020.

Saragadam et al., Programmable Spectrometry: Per-pixel Material Classification using Learned Spectral Filters. arXiv:1905.04815v1 [eess.IV] May 2019.

Réfrégier et al., Compressed Raman classification method with upper-bounded error probability. Optics Letters, vol. 44, Issue 23, pp. 5836-5839 (2019).

Réfrégier et al., Bhattacharyya bound for Raman spectrum classification with a couple of binary filters. Optics Letters, vol. 44, Issue 9, pp. 2228-2231 (2019).

Huser et al. "Raman spectroscopy for physiological investigations of tissues and cells." Advanced drug delivery reviews 89: 57-70 (2015).

* cited by examiner

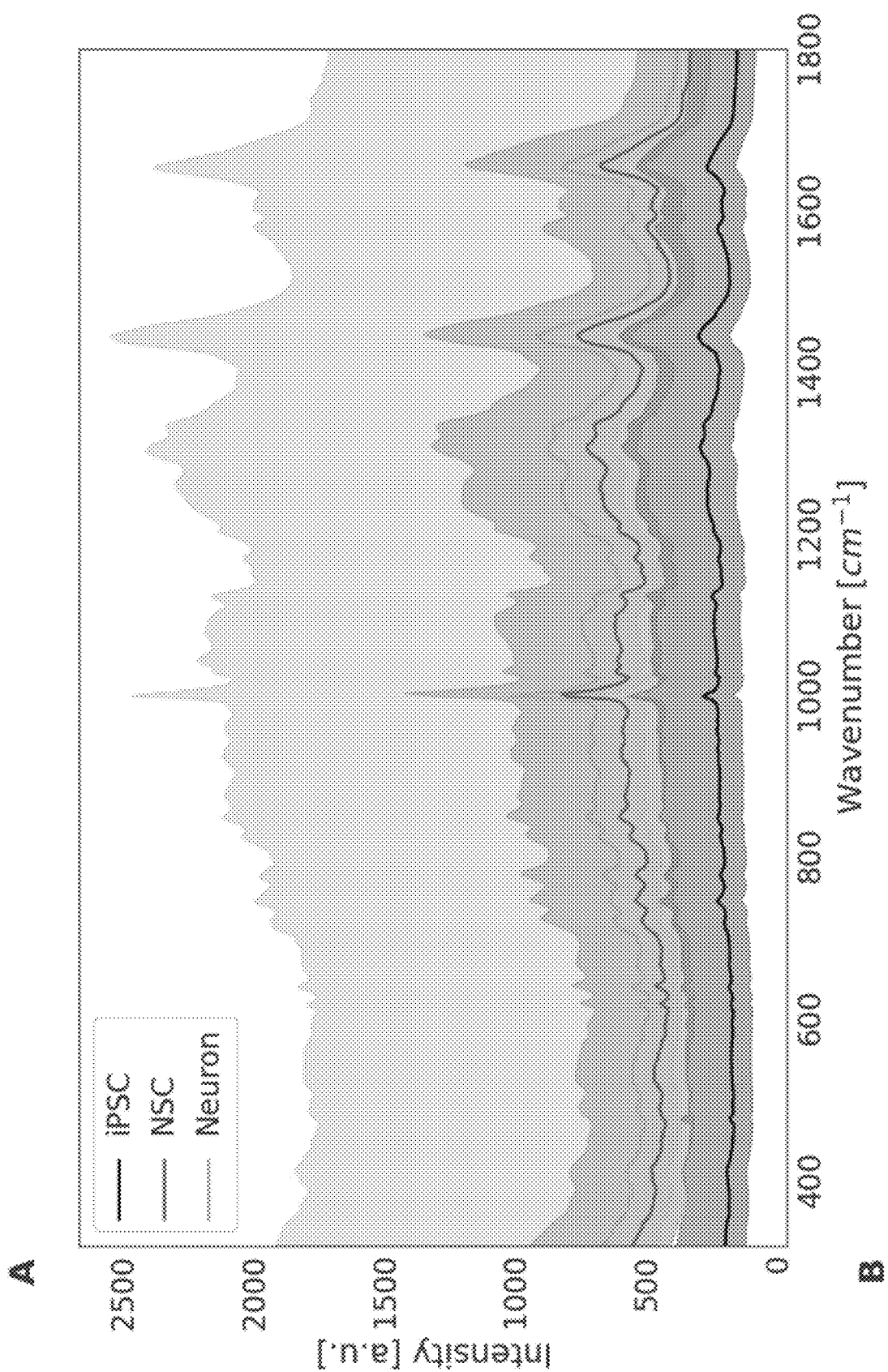

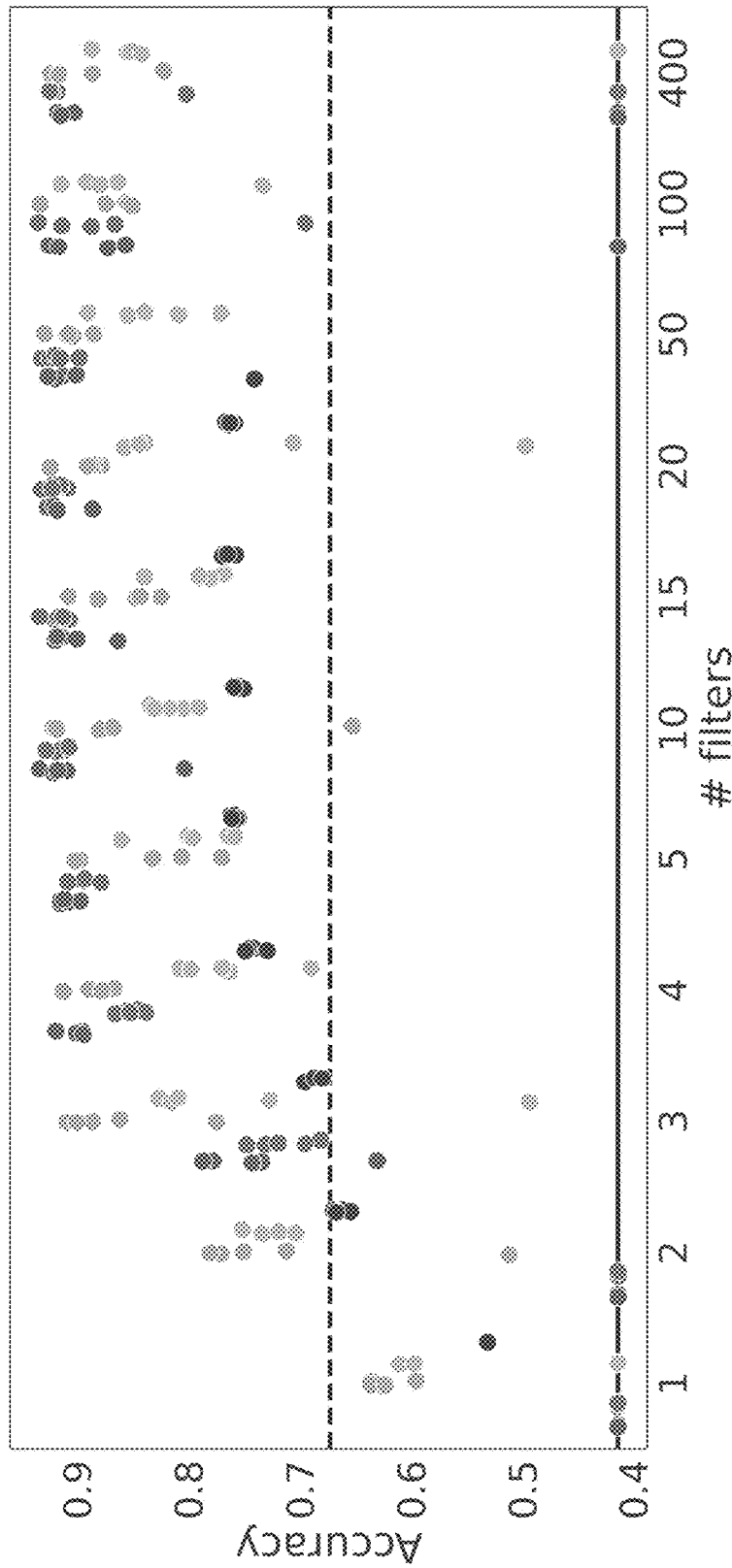

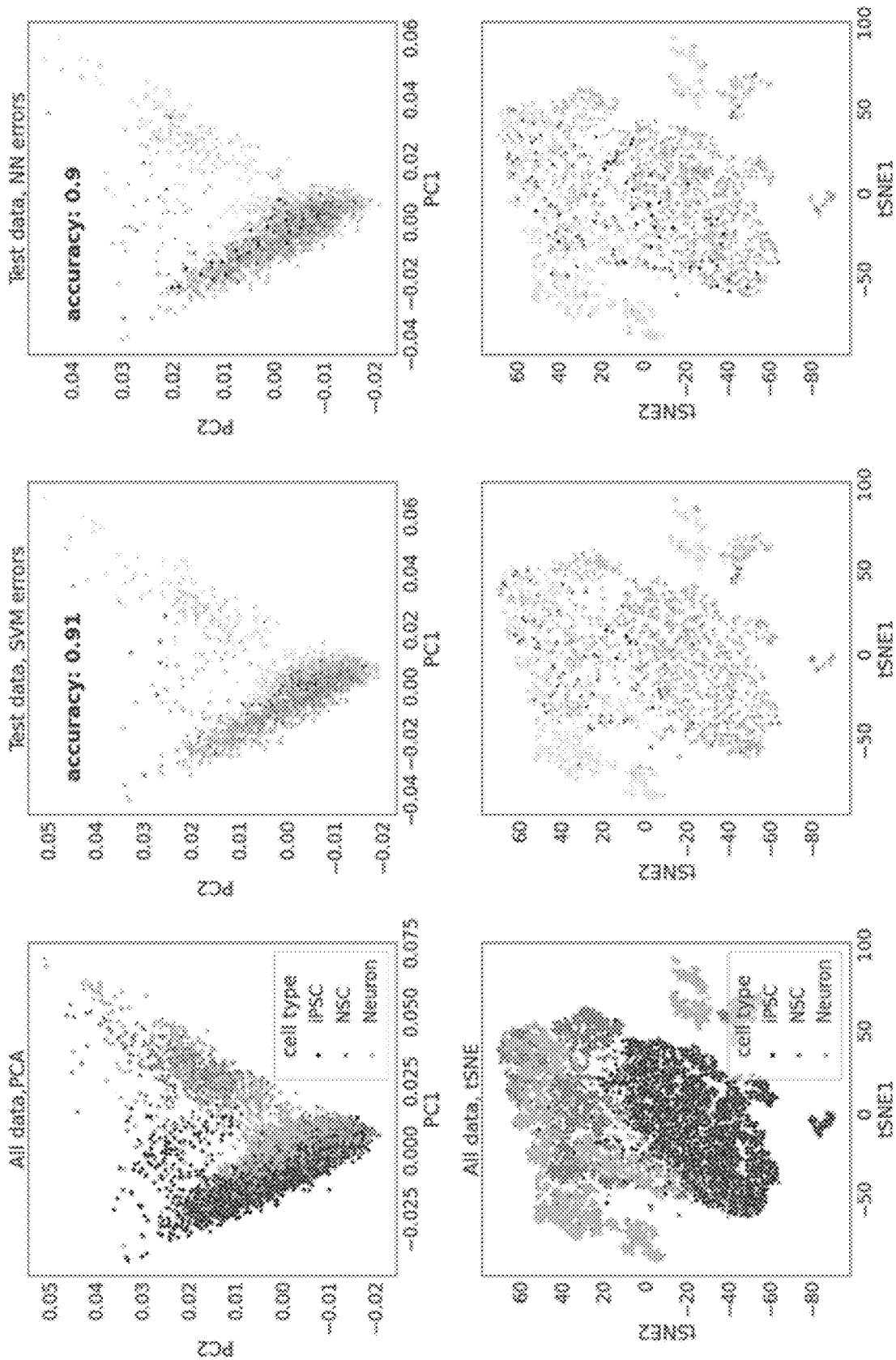

COMPRESSIVE RAMAN CLASSIFICATION OF CELLS USING A NEURAL NETWORK FOR OPTICAL FILTER DESIGN AND CELL CLASSIFICATION

FIELD OF THE INVENTION

The present invention relates generally to techniques for Raman spectroscopy. More specifically, it relates to methods for using Raman spectroscopy compressive sensing and neural networks for classification of cells.

BACKGROUND OF THE INVENTION

Cells have been studied extensively as potential therapeutic agents with unique properties and the first cell-based therapies, such as CAR T-cell therapy for cancer are being applied in the clinic. The unique capabilities and tremendous potential of cell-based therapies come with a challenging production process. Whereas the manufacture of small molecule drugs has been standardized, automated, and scaled up, cell products typically require manual labor, suffer from intrinsic heterogeneity and are difficult and laborious to optimize. One reason for these difficulties is the lack of quantitative, non-invasive readouts of a cell's state during the production process. Currently, quality control of cell products occurs in a sample of the final product, which is problematic for several reasons. If quality control fails, the typically lengthy production process has to be repeated, which might delay a time-critical therapy. Additionally, the cells that are sampled for quality control cannot be used for therapy as existing measurement methods are destructive. Since there are considerable differences between individual cells in a population the, necessarily untested, therapeutic product might contain cells that are harmful to the recipient. For these reasons, there is a need for non-destructive measurement methods that can assess the state of all cells in a population without exogenous labels or manipulations that might have a negative impact on safety. Such methods would be extremely useful for academic researchers working on novel cell-based therapies, clinicians who may want to test therapeutics before administering them to patients and pharmaceutical companies that seek to produce cell-based therapies at scale.

Raman spectroscopy has been used for the characterization of cells. However, there are significant problems with existing techniques. Raman spectra can be collected from a very broad set of molecules ranging from carbohydrates over lipids to nucleic acids and proteins. A Raman spectrum of a cell is therefore essentially a fingerprint of the cell's chemical composition. Unsurprisingly, it has been used in regenerative medicine applications. Unfortunately, the spontaneous Raman effect, which is due to the inelastic scattering of light, has low efficiency and the intensity of the scattered light is therefore low. Consequently, collecting enough photons to obtain a complete Raman spectrum covering all relevant molecular species takes time and precludes high-throughput applications. One possible solution to this problem is provided by compressive sensing. In this approach, only linear combinations of Raman intensities at certain wavenumbers are measured at once, and only a handful of them is needed, thereby greatly reducing measurement time. Mathematically, a compressive measurement is a dot product between two vectors: the complete Raman spectrum and a filter vector. For technical reasons related to the implementation of the measurement with optical elements, the filter vector is subjected to constraints. Typically, a filter is required to be binary, so that a compressive measurement provides the sum of a subset of Raman intensities. Whereas a limited number of compressive measurements with different filters are not sufficient to reconstruct the complete Raman spectrum without error, they contain enough information to determine the composition of a mixture of chemicals with high accuracy. Existing procedures to find optimal filters require the noise-free Raman spectra of individual molecular species to be known and assume specific distributions of the noise. They are therefore not directly applicable to cell products, for which noise-free reference spectra are impossible to obtain and biological variability has a much bigger influence than photon counting or measurement noise.

In conclusion, non-destructive, label-free methods to characterize cells in real time are needed to optimize the production process and improve quality control. Current approaches using Raman spectroscopy, which provides a fingerprint of a cell's chemical composition, are too slow for high-throughput applications. Compressive Raman techniques, which measure only linear combinations of Raman intensities, can be fast but still face significant challenges to deliver high performance.

SUMMARY OF THE INVENTION

The present inventor has discovered a technique to extend the compressive Raman approach from the classification of molecular species to the classification of cells. The technique uses a data-driven approach for both classification prediction and the design of optical filters. A neural network, such as multilayer perceptron, is trained on training data including Raman spectra of cells and associated cell state or type as the label. In other words, the input to the network is a Raman spectrum and the output is a predicted label. Calculating the activation of a unit in the first hidden layer of such a network thus involves the dot product of a Raman spectrum and the weights of that unit. These weights therefore directly correspond to a filter that can be used in compressive sensing. Once the weights are learned in the training phase, they can be implemented with a suitable optical element such as a digital micromirror device. In the prediction phase, compressive Raman measurements are carried out using the filters (i.e., weights) optimized for a specific classification task. The results of these measurements are then used directly instead of the dot products of weights and spectra in the activation function of the first hidden layer. In the training phase optimal filters can be obtained, overcoming two significant problems. First, input data for deep learning models is usually normalized to enable efficient learning. In our compressive sensing scheme, the inputs to the optimized filters are raw, unnormalized Raman spectra. Therefore, a normalization layer is introduced right after the first hidden layer. The weights in a neural network are by default unconstrained, which means they can take arbitrary, continuous values, which might be negative. Such weights are difficult to implement with an optical device. Hence, a technique is provided to obtain binary weights while maintaining high classification accuracy.

The cell classification technique may be implemented on a device that includes a diffractive element to create the Raman spectrum, an adjustable optical filter, and a point detector. Such a device would work in conjunction with a commercially available microscope. Readout and control of the measurement system may be performed by a dedicated computer (equipped with a data acquisition card) provided with control software and software implementing the neural network for classification prediction.

In operation, the system performs compressive sensing and uses pre-determined optimal parameters for an optical filter. The optical filters are implemented using an adjustable optical element, such as a digital micromirror device. Compressive sensing measurements from the optics are input to a neural network to return a predicted cell classification. Specific sets of filters may be used for specific applications. Some highly distinct cell states (such as proliferative, stressed etc.) may be assessed with a universal filter set.

The technique may be implemented using an add-on to a commercially available microscope. This add-on creates Raman spectra of cells and filters those with the digital micromirror device. It communicates with a dedicated computer that calculates optimal filter parameters, having been provided with training samples provided by the end user. The computer also controls the digital micromirror device to implement the filters in real time, and it may provide the analysis (characterization) of the cells using a neural network for prediction. Alternatively, the measured data from the add-on could be streamed to a service provider that carries out filter design and data analysis.

The technique disclosed herein reduces measurement time by two orders of magnitude. In a data set containing Raman spectra of three different cell types, it achieves up to 91% classification accuracy using only 5 linear combinations of Raman intensities. This method makes feasible the use of Raman spectroscopy for the characterization of cell products.

In one aspect, the invention provides a method for Raman spectroscopy-based cell classification, the method comprising: a) performing a compressive Raman measurement of a cell sample; wherein performing the compressive Raman measurement comprises: i) performing laser microscopy of the cell sample to produce a collimated optical signal, ii) dispersing by a diffractive element the collimated optical signal to produce a dispersed optical signal, iii) frequency filtering the dispersed optical signal by a tunable optical filter that selects wavenumber intervals of the dispersed optical signal to produce a filtered signal, wherein a response of the tunable optical filter is defined by weights; wherein the tunable optical filter is preferably implemented using a spatial light modulator, such as a digital micro-mirror device; and iv) detecting by an optical detector, such as a photomultiplier tube, the filtered signal to produce the compressive Raman measurement; b) repeating step (a) with different tunable optical filter weights to produce multiple compressive Raman measurements; c) processing the multiple compressive Raman measurements by a prediction neural network to predict a label of the cell sample; d) outputting the label of the cell sample for use for research purposes or quality control; wherein the tunable optical filter weights defining the response of the tunable optical filter are derived from trained weights of a first hidden layer of a calibration phase neural network trained on training data comprising Raman spectra of cells and corresponding labels including cell type or cell health; wherein the prediction neural network is derived by removing an input layer and the weights of the first hidden layer from the calibration phase neural network while retaining biases of the first hidden layer and weights and biases of all subsequent layers of the calibration phase neural network. The calibration phase neural network is preferably a multilayer perceptron neural network.

The calibration phase neural network preferably has a normalization layer after the first hidden layer. The calibration phase neural network trained on training data is preferably pre-trained with a constraint that weights in the first hidden layer are non-negative, then further trained with a constraint that the weights in the first hidden layer are binary.

The method may also include communicating the multiple compressive Raman measurements from the optical detector to the prediction neural network via a digital computer network to a cloud-based server.

Processing the multiple compressive Raman measurements by the prediction neural network to predict the label of the cell sample may be performed by inputting the multiple compressive Raman measurements to the prediction neural network, wherein the multiple compressive Raman measurements replace the dot products of Raman spectra with the weights in the first hidden layer of the calibration phase neural network.

The method may also include training the calibration phase neural network using training data comprising the Raman spectra and the corresponding labels; and communicating the trained weights of the first hidden layer of the calibration phase neural network to the tunable optical filter.

BRIEF DESCRIPTION OF THE DRAWINGS

FIGS. 2A, 2B are graphs showing that raw Raman spectra of iPSCs, NSCs and Neurons are strongly overlapping, where FIG. 2A is a graph of Raman intensities for different cell types before preprocessing, and FIG. 2B is a graph of mean intensities of individual Raman spectra before preprocessing.

FIG. 3 is a graph of accuracy vs. number of filters, illustrating how just 4 or 5 compressive measurements are sufficient to classify cell types with high accuracy.

FIG. 4A shows graphs of weight magnitude vs wavenumber index, and FIG. 4B shows a graph of dot products of the 5 filters and raw Raman spectra averaged per cell type and subsequently standardized filter- and cell type-wise.

FIG. 5A shows a baseline calculated by asymmetric least-squares smoothing is subtracted from the raw measurement, and FIG. 5B shows the baseline-corrected measurement shown is normalized to the sum of intensities over all considered wavenumbers.

FIG. 6A shows the complete fingerprint region, and FIG. 6B shows a magnified portion of the graph from 319 $cm^{-1}$ to 673 $cm^{-1}$.

FIGS. 7A, 7B are graphs showing support vector machine and neural network classify cell types with high accuracy, where FIG. 7A shows confusion tables of the SVM or NN classification of held-out test data, and FIG. 7B shows two-dimensional embeddings of the data.

FIG. 10A shows examples of simulated spectra for 3 species, with different levels of Pearson correlation, FIG. 10B shows correlation between spectra versus the fraction of a shared, 'common' spectrum, FIG. 10C shows Bhattacharyya bound (BB) and classification error of BB-based optimization for various levels of correlation and numbers of photons, and FIG. 10D shows classification accuracy for the NN model or BB-based optimization for different correlations between the spectra and numbers of photons ($N_{phot}$).

FIG. 11D shows classification accuracy of an NN model with 5 units in the first hidden layer.

FIG. 12A shows Model A, used for classification of preprocessed spectra, and FIG. 12B shows Model B, used for classification of raw spectra and optimal filter design by introducing a binarity constraint on the weights of the first hidden layer.

DETAILED DESCRIPTION OF THE INVENTION

Figure 1A:
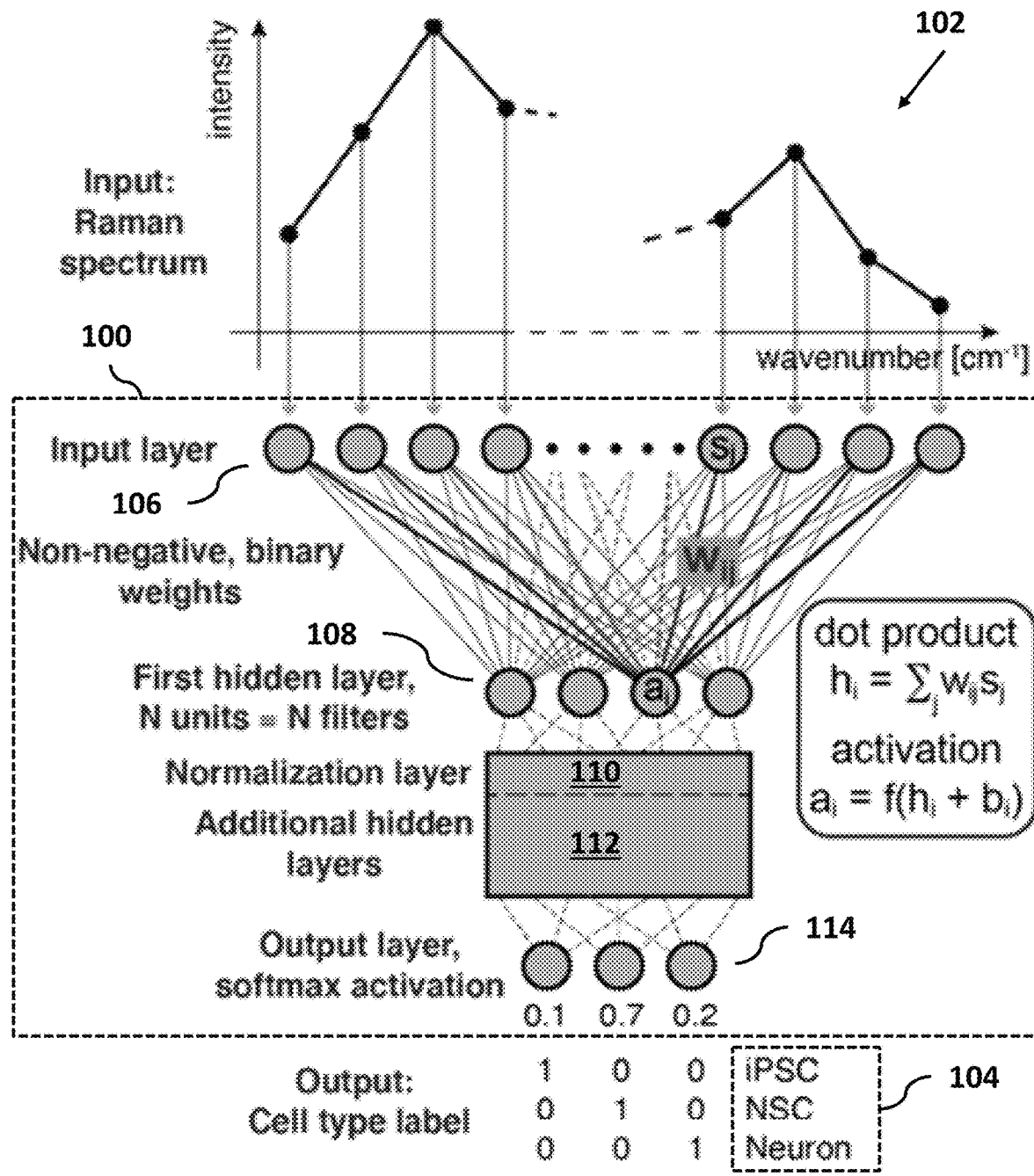
FIGS. 1A, 1B, 1C are schematic diagrams illustrating an overview of an approach to cell classification including a training phase, an implementation phase, and a prediction phase, according to embodiments of the invention.

The techniques disclosed herein address the need for non-destructive measurement methods that can assess the state of all cells in a population without exogenous labels or manipulations that might have a negative impact on safety. The requirement to be non-destructive and label-free narrows down the choice of potential readouts to optical or electrical modalities. Light microscopy has been used extensively to assess cell morphology and can detect the early onset of cell differentiation when coupled with deep learning. Electrical impedance is used routinely to measure cell viability and is currently explored in assays of cell adhesion and differentiation. Notwithstanding the usefulness and importance of these techniques, their information content is limited and insufficient to characterize a cell's state comprehensively.

Spectroscopic methods can in principle provide significantly more information than conventional light microscopy. For example, autofluorescence spectroscopy can reveal useful information about a cell's metabolic state but it is restricted to molecules that autofluoresce. Autofluorescence spectra of particular molecular species also tend to be broad and nearly unimodal, which makes them difficult to unmix. Raman spectra, on the other hand, can be collected from a very broad set of molecules ranging from carbohydrates over lipids to nucleic acids and proteins. A Raman spectrum of a cell is therefore essentially a fingerprint of the cell's chemical composition. Unfortunately, the spontaneous Raman effect, which is due to the inelastic scattering of light, has low efficiency and the intensity of the scattered light is therefore low. Consequently, collecting enough photons to obtain a complete Raman spectrum covering all relevant molecular species takes time and precludes high-throughput applications.

One possible solution to this problem is provided by compressive sensing. In this approach, only a few linear combinations of Raman intensities at certain wavenumbers are measured, thereby greatly reducing measurement time. Mathematically, a compressive measurement is a dot product between two vectors: the complete Raman spectrum and a filter vector. For technical reasons related to the implementation of the measurement with optical elements, the filter vector is subjected to constraints. Typically, a filter is binary, so that a compressive measurement provides the sum of a subset of Raman intensities. Whereas a limited number of compressive measurements are not sufficient to reconstruct the complete Raman spectrum without error, they contain enough information to determine the composition of a mixture of chemicals with high accuracy. There are known techniques for mathematically rigorous determination of optimal filters for compressive Raman regression and classification in the presence of photon counting and measurement noise. These techniques, however, require the noise-free Raman spectra of individual molecular species to be known and assume specific distributions of the noise. They are therefore not directly applicable to cell products, for which noise-free reference spectra are impossible to obtain and biological variability has a much bigger influence than photon counting or measurement noise. To extend the compressive Raman approach from the classification of molecular species to the classification of cells, one must overcome this challenge.

This description presents a solution to this challenge using a data driven approach for the design of optimal filters. An overview of the approach is provided in FIGS. 1A, 1B, 1C, which illustrate a training phase, an implementation phase, and a prediction phase, respectively.

A key feature of this approach is to use a neural network, such as a multilayer perceptron, recurrent neural network, convolutional neural network, or transformer. The network is trained on the Raman spectra of cells for which the cell state or type is provided as the label to be learned. In other words, the training input to the network is a Raman spectrum and the output is a label. In the training phase (FIG. 1A) a multilayer perceptron neural network 100 is trained using training data to output a cell type label 104 from an input Raman spectrum 102. The Raman spectrum 102 is represented as a vector s whose elements are intensities indexed by wavenumbers j. The spectrum is input to an input layer 106 of the network 100. Following the input layer 106 is a first hidden layer 108. The first hidden layer has N units, indexed by i, each with weights represented by a vector $w_i$ and bias $b_i$. Calculating each component of the activation $a_i$ of unit i in the first hidden layer 108 involves: taking a dot product $h_i$ between the weight vector $w_i$ of unit i and the Raman spectrum s, adding a bias $b_i$ and calculating the activation $a_i$ using an activation function f. The weight vectors and biases of all layers of the neural network are optimized during training of the neural network. The ReLU function is used as activation function, but it could be another suitable function. The dot product $h_i$ is mathematically equivalent to a compressive measurement. To be usable as optical filters, the weights are constrained to be non-negative and binary. A normalization layer 100 directly after the first hidden layer 108 ensures efficient training. Following the normalization layer 110 are multiple hidden layers 112 and then a softmax activation layer 114 which outputs labels, such as cell types or cell states 104.

Calculating the activation of a unit in the first hidden layer of such a network involves the dot product of a Raman spectrum and the weights of that unit. These weights therefore directly correspond to a filter that can be used in compressive sensing. Once the weights are learned in the training phase, they can be implemented with a suitable optical element such as a digital micromirror device. In the implementation phase (FIG. 1B), the weights $w_i$ of the N units in the first hidden layer 108 of the trained calibration/training phase neural network 100 are used to physically implement N optical filters using a spatial light modulator 120 such as a digital micromirror device. The output $m_i$ of filter i, collected by a point detector 122, is a compressive measurement of a Raman spectrum. A sample 124 is imaged by a microscope 126 performing laser microscopy. The resulting collimated optical signal 128 is dispersed by a diffractive element 130 to produce a dispersed optical signal 132 which is frequency filtered by the tunable optical filter 120, whose response is defined by the weights $w_i$. The filtered signal 134 is then detected by the point detector 122 to produce a compressive Raman measurement $m_i$ for the filter i.

For prediction of unseen cells in a prediction phase (FIG. 1C), N compressive Raman measurements are sequentially performed using N different filters 140 to produce N measurements 142. Each physical measurement uses the tunable spatial light modulator 120 to implement each filter i. For prediction, the N measurements are used as inputs to a prediction neural network 144 which is simply the trained neural network 100 without the input layer 106. The N measurements replace the dot products $h_i$ in the first hidden layer 108 of the trained calibration/training phase neural network 100, which is now effectively the input layer of the prediction neural network 144. The output of the prediction neural network 144 is a cell type label 146, just as in the trained calibration/training phase neural network 100.

Two significant challenges of this approach are overcome by specific choices of network design and training procedure. First, input data for deep learning models is usually normalized to enable efficient learning. In our compressive sensing scheme, the inputs to the optimized filters are raw, unnormalized Raman spectra. Therefore, a normalization layer 110 is implemented right after the first hidden layer. Secondly, the weights in the neural network are by default unconstrained, which means they can take arbitrary, continuous values, which might even be negative. Such weights are difficult to implement with an optical device. Instead, binary weights are used. To ensure efficient training, the calibration/training phase neural network 100 is first trained with a non-negativity constraint on the weights in the first hidden layer. The weights of the resulting model are then copied to a new network with identical architecture but a binarity constraint on the weights in the first hidden layer. A custom constraint method is used to enforce the constraint.

Figure 1B:
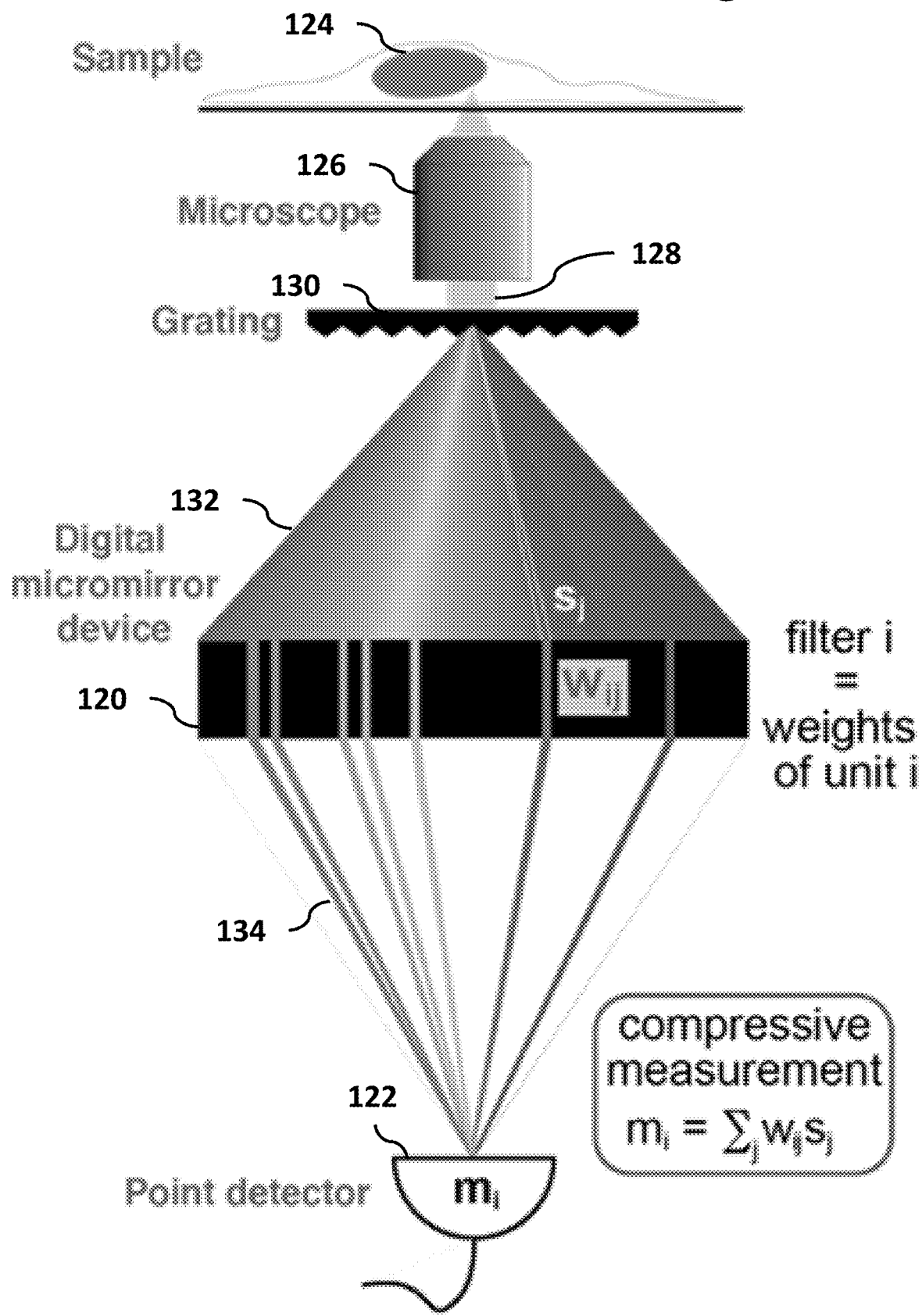
Figure 1C:
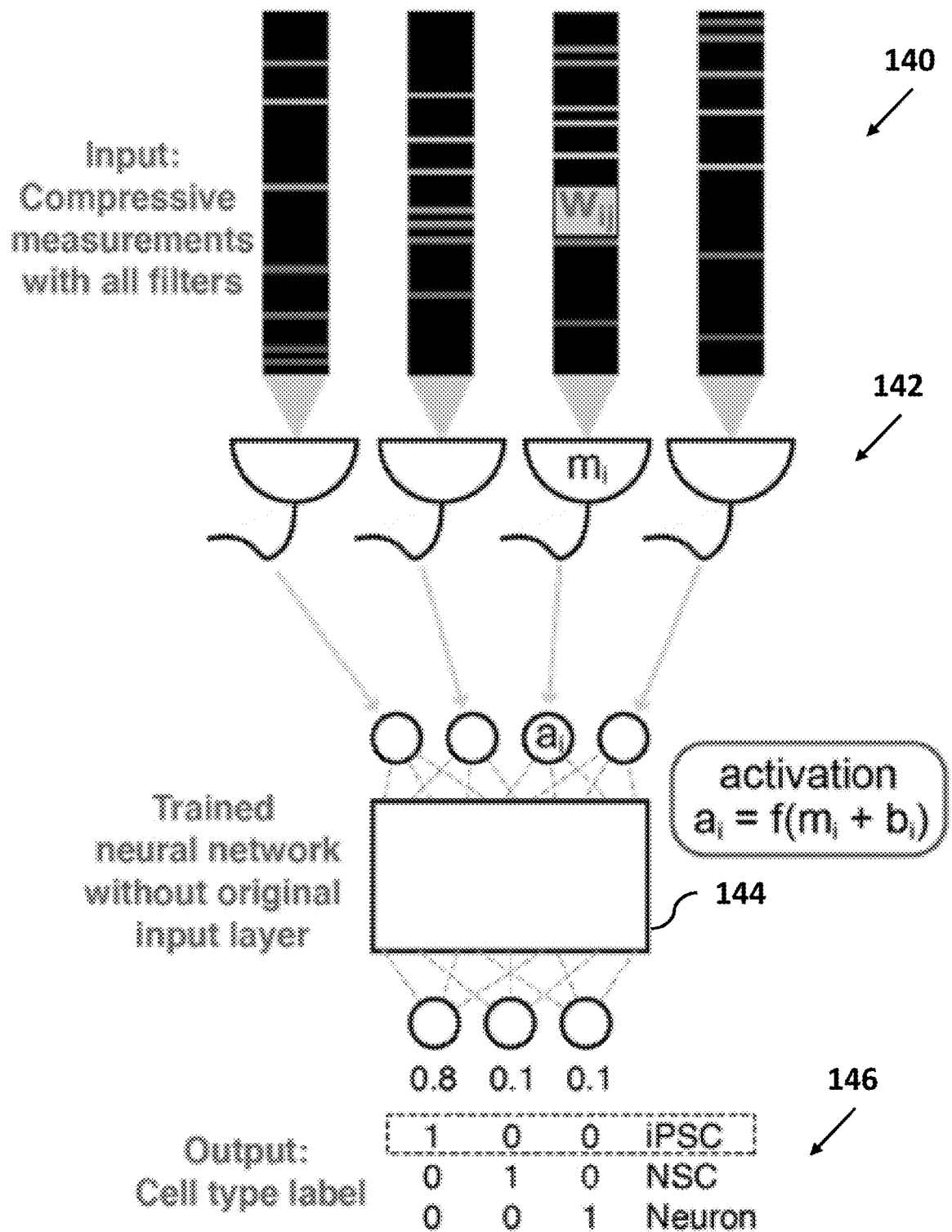
Figure 1D:
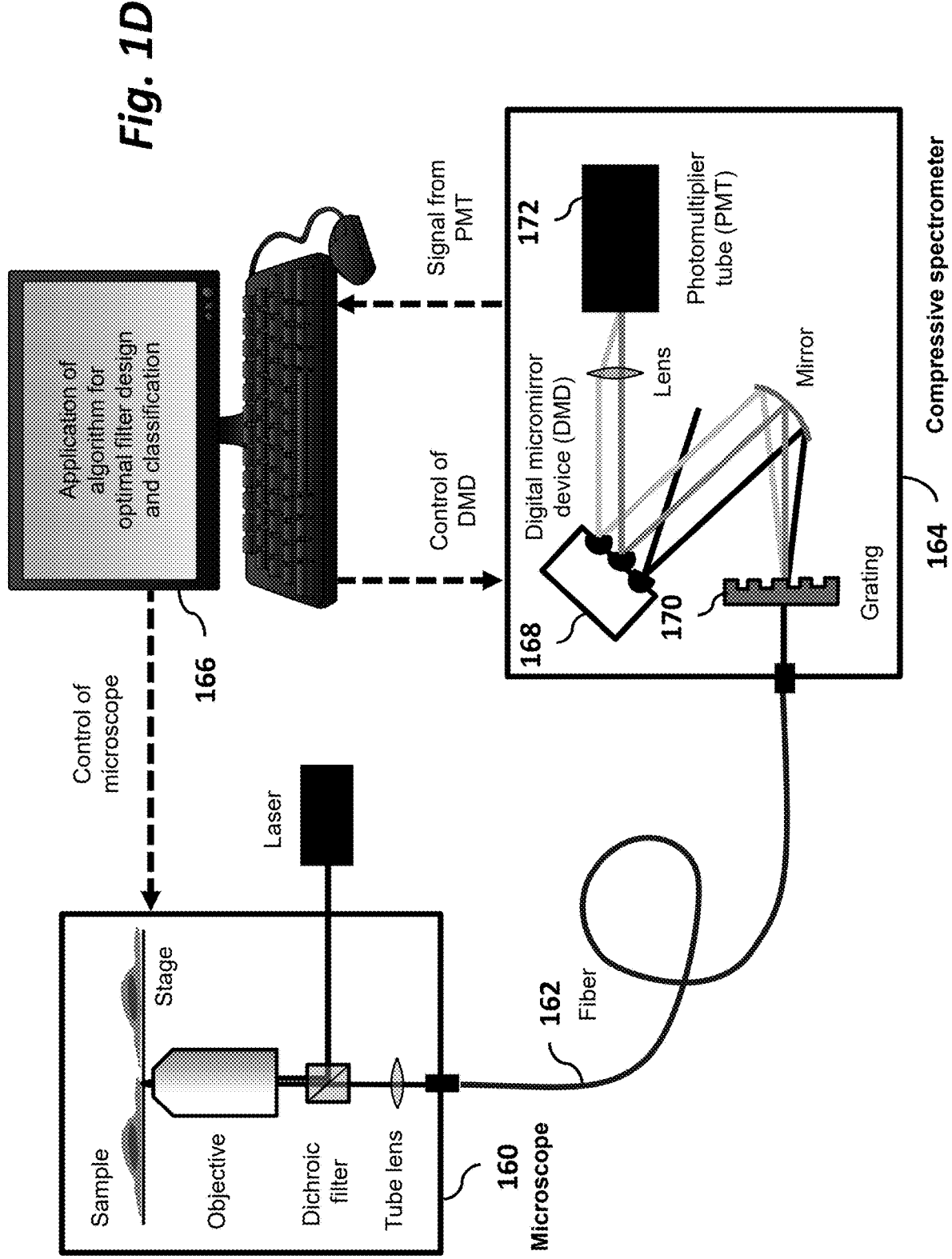
FIG. 1D is a schematic diagram of an apparatus for implementing a technique for cell classification, according to an embodiment of the invention.

FIG. 1D is a schematic diagram of an apparatus for implementing the technique for cell classification. A standard, commercially available laser microscope 160 performs laser microscopy of the cell sample to produce a collimated optical signal that is transmitted by a fiber 162 to a compressive spectrometer 164. The compressive spectrometer device 164 includes a diffractive element 170 (e.g., a grating), a tunable optical filter 168, and an optical detector 172 (e.g., photomultiplier tube). The tunable optical filter is preferably implemented as a spatial light modulator such as a digital micromirror device. Alternatively, the tunable optical filter may be implemented as a liquid crystal tunable filter, acousto-optic tunable filter, or microphotonics-based filter. The tunable optical filter's frequency response is defined by weights provided by a computer 166 that also controls the microscope 160 and receives and records measurement signals from the optical detector 172. The diffractive element 170 disperses the collimated optical signal to produce a dispersed optical signal that reflects off a mirror to form a collimated dispersed optical signal incident upon the tunable optical filter 168. The tunable optical filter 168 frequency filters the dispersed optical signal by selecting wavenumber intervals of the dispersed optical signal to produce a filtered signal, which is then focused by a lens upon the optical detector 172 to produce the compressive Raman measurement for the particular filter defined by the weights sent from the computer 166 which implements the neural network processing to generate the cell type prediction. It is noted that the computer 166 is not necessarily located near the optical apparatus and may be connected to the microscope and compressive spectrometer via a data connection over a data communications network. For example, the computer 166 may be a cloud server. Alternatively, both a cloud server and local computer may be used to perform different parts of the processing and control. For example, a local computer may perform control of the microscope and tunable optical filter, while a cloud server implements the neural network processing of the measurements to produce the cell classification.

Figure 1E:
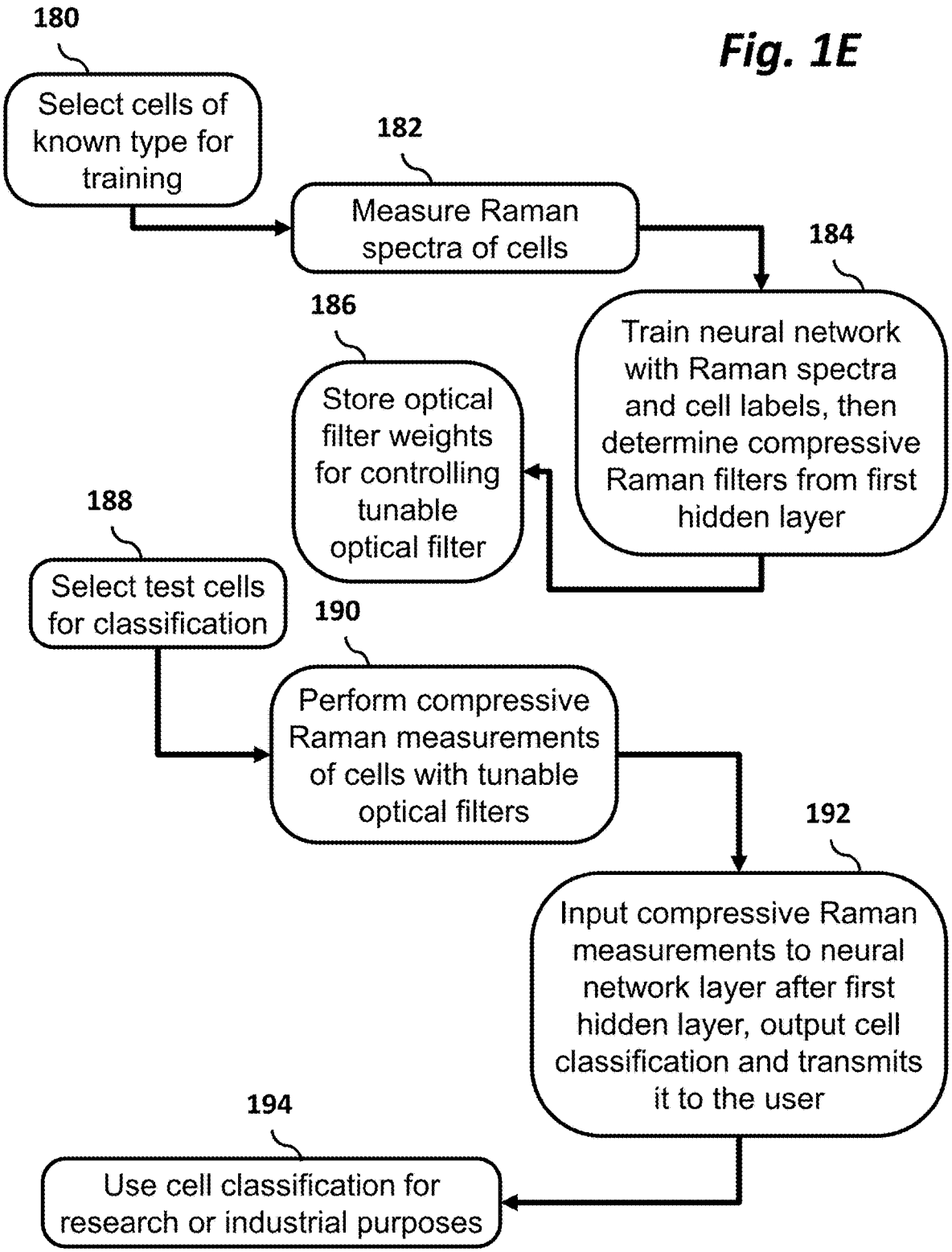
FIG. 1E is a schematic diagram illustrating steps of the techniques for calibration/training and predictive measurement, according to an embodiment of the invention.

FIG. 1E is a schematic diagram illustrating steps of the techniques for calibration/training and predictive measurement according to an embodiment of the invention. In step 180 a user selects training samples such as cells and corresponding labels (e.g., healthy, stressed, dying). In step 182 the spectrometer performs Raman measurements of the cells to produce Raman spectra. In step 184 the Raman spectra and associated labels are used by the computer as training data to train the neural network, and a set of compressive Raman filter weights are derived from the first hidden layer of the trained network. In step 186 the compressive spectrometer receives the filter weights which can then be used to control the tunable optical filter to make compressive Raman measurements using the various filters. In step 188 a user selects a cell sample for classification. In step 190 the compressive spectrometer performs several compressive Raman measurements using the various filters and sends the measurement results to the computer. In step 192 the computer inputs the compressive Raman measurements to the neural network (where the measurements replace the dot products in the first hidden layer of the trained calibration/training phase neural network), and the network outputs the cell classification label. In step 194 the user receives the classification label of the cell sample (e.g., healthy, stressed, or dying).

We tested this neural network architecture and the associated training procedure on a data set containing the Raman spectra of induced pluripotent stem cells (iPSCs), neural stem cells (NSCs) and Neurons. We demonstrated up to 87% classification accuracy with only 4 filters and up to 91% with 5 filters. This is comparable to the accuracy of a support vector machine or neural network trained using complete Raman spectra with more than 400 intensities. Our method thus reduces measurement time by two orders of magnitude and thereby enables high-throughput characterization of cell products.

We now describe the methods and validation of the technique in further detail.

Example Data Set and Preprocessing

Figure 2B:
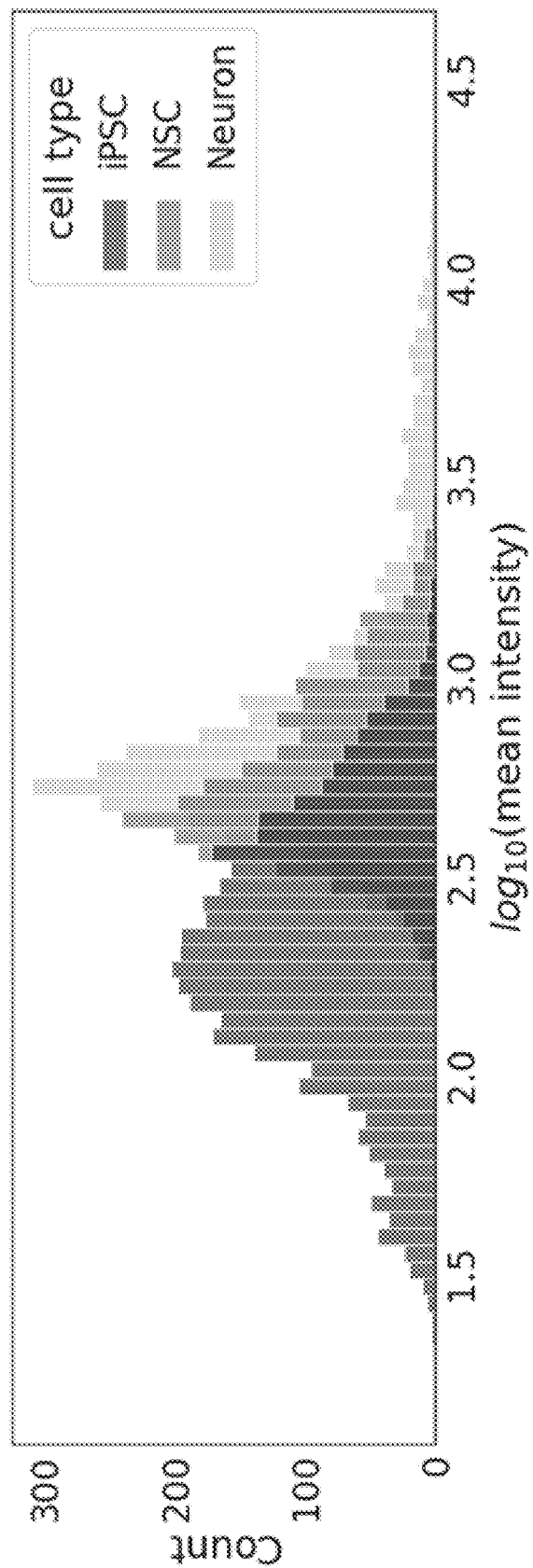

We downloaded a publicly available data set of Raman spectra and removed failed measurements (spectra with only zeros) to obtain 9308 spectra: 3850 spectra from 180 iPSCs, 2342 spectra from 176 NSCs and 3116 spectra from 180 neurons. On average, 17.4 measurements were taken per cell. Measurements are distributed across 3 cell lines and 3 technical replicates per cell line. For each technical replicate in each cell line, 20 cells were measured, with one exception, where data for only 16 cells was reported. Table 1 shows a breakdown of the used data set. An overview of the raw spectra is shown in FIGS. 2A, 2B.

Figure 5A:
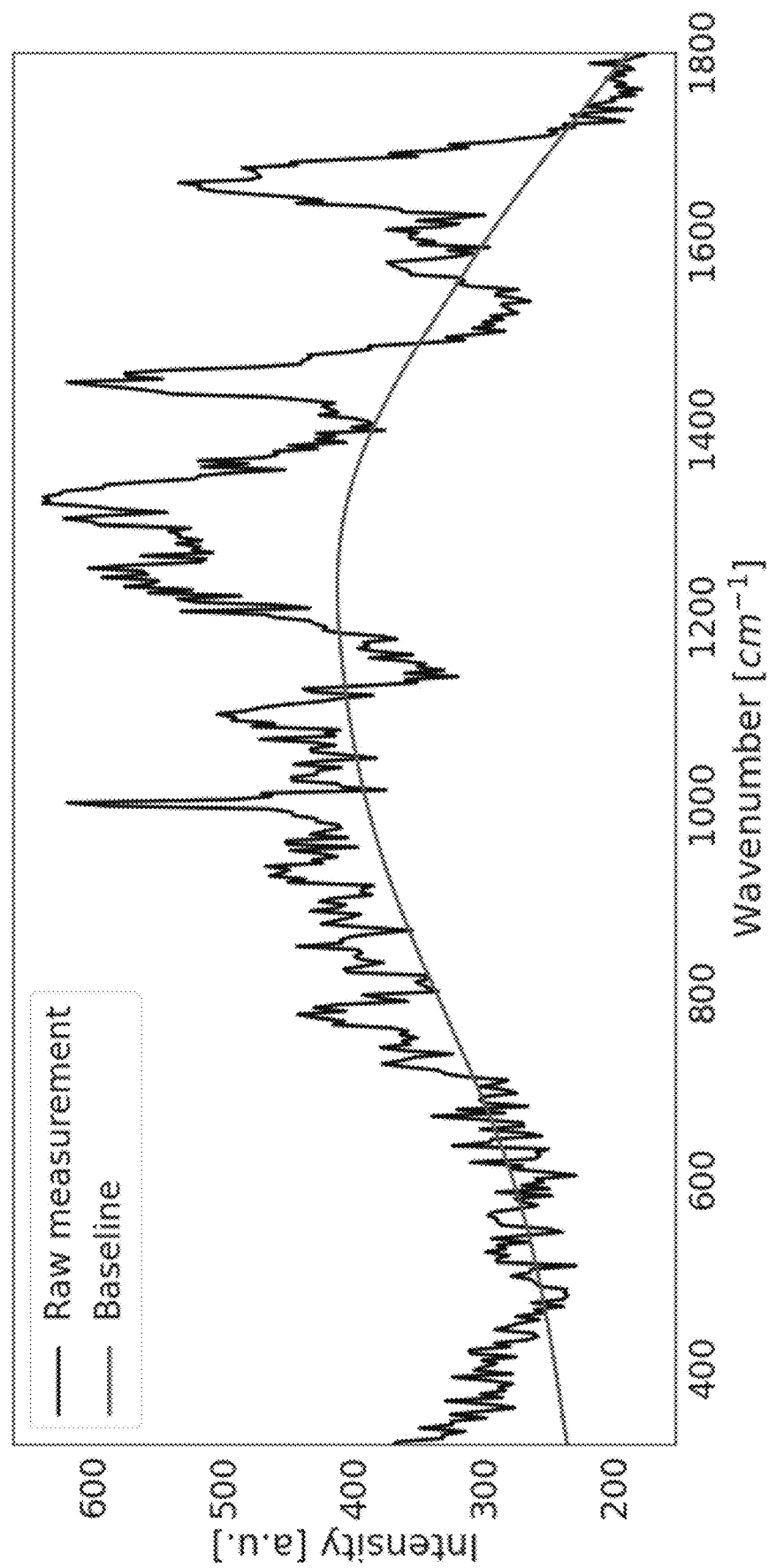
FIGS. 5A, 5B are graphs of measured intensity vs wavenumber, illustrating how preprocessing removes a slowly varying baseline and normalizes spectra, where
Figure 5B:
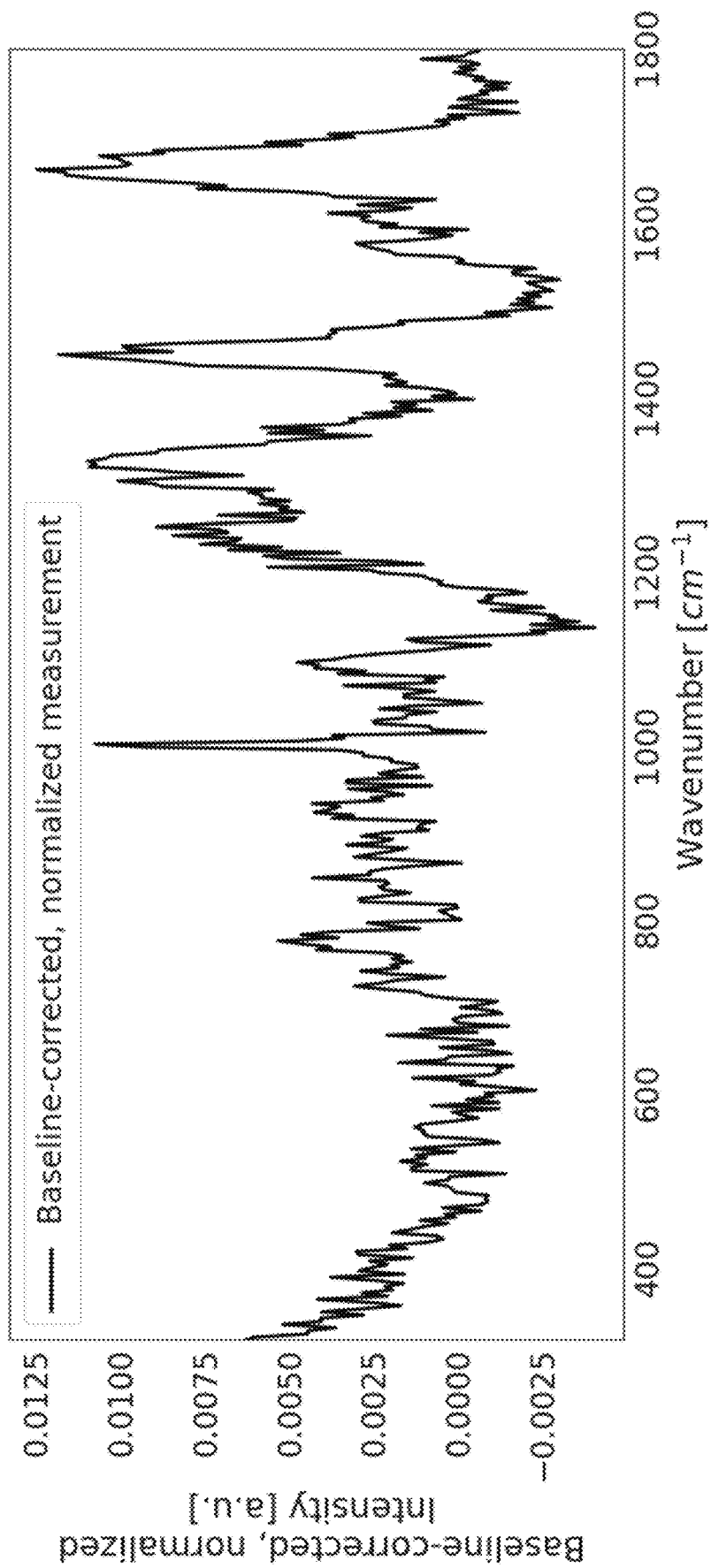
Figure 6A:
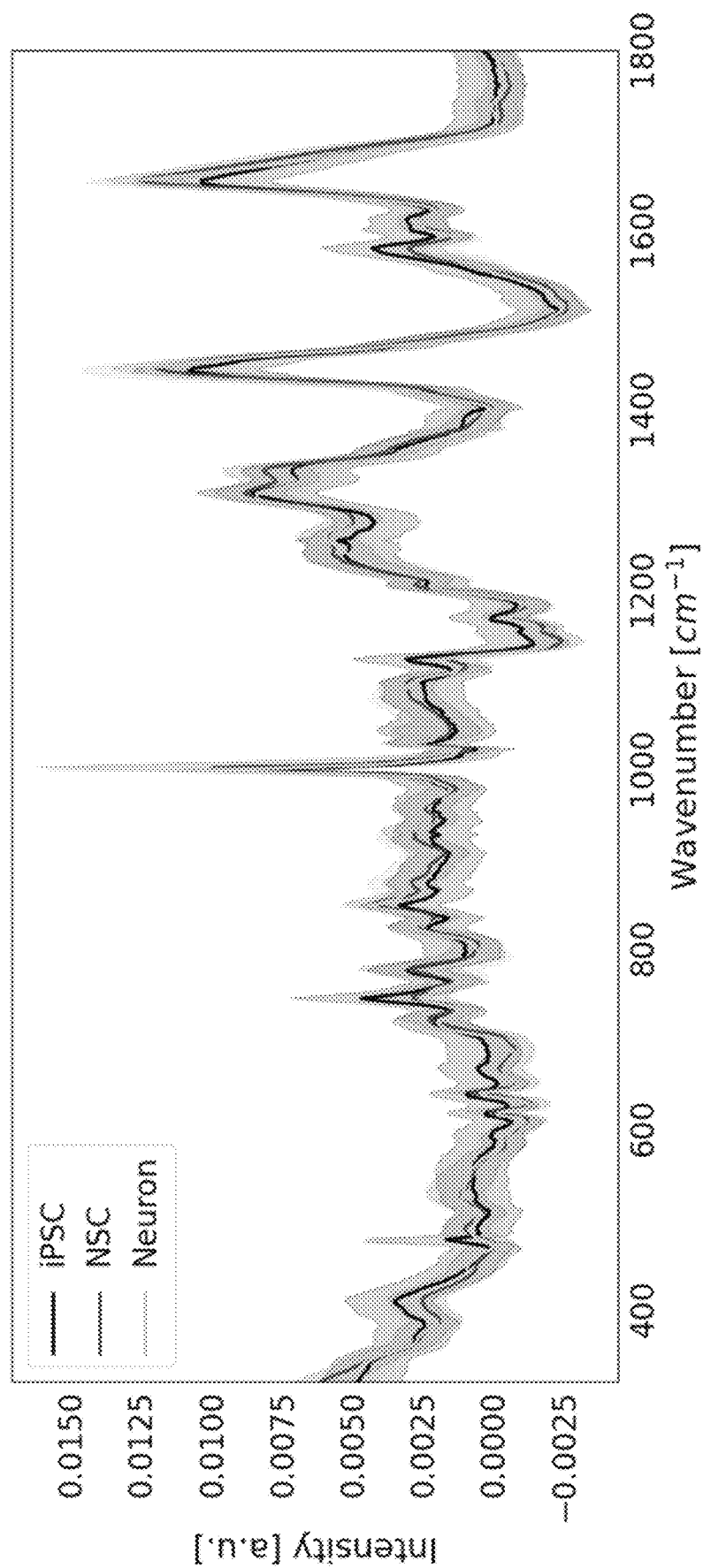
FIGS. 6A, 6B are graphs of intensity vs. wavenumber illustrating how preprocessing (baseline removal and normalization) reduces, but does not eliminate, overlap of Raman spectra, where
Figure 6B:
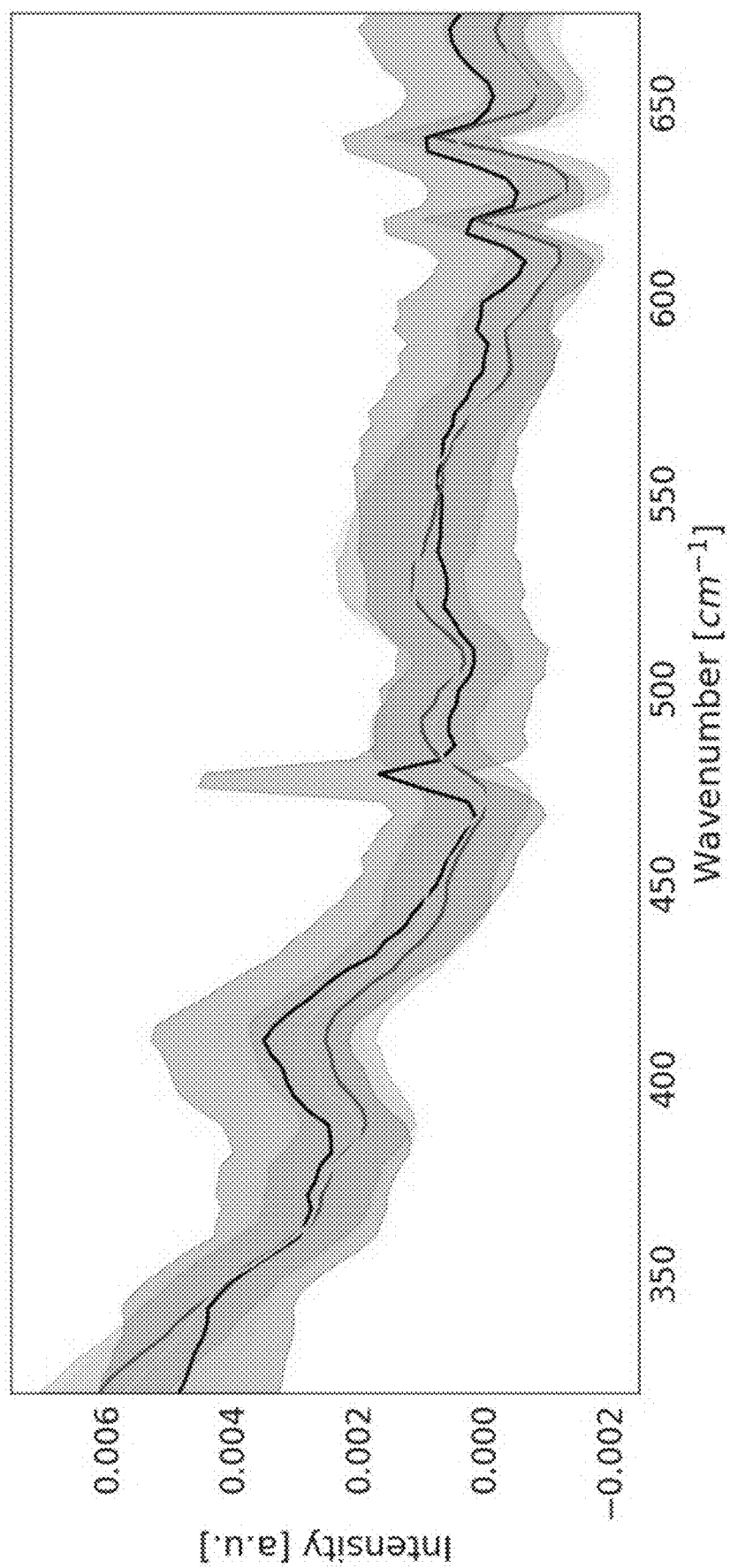

Prior to classification with the support vector machine and neural network model A (see below), leading to the results shown in FIG. 3 and FIGS. 7A, 7B, spectra were preprocessed by baseline removal and normalization. A slowly varying baseline was estimated by asymmetric least squares smoothing. For each spectrum we ran the smoothing algorithm for 10 iterations with a smoothness penalty parameter of 106 and an asymmetry parameter of 0.1 and subtracted the resulting baseline from the raw spectrum. Baseline-corrected spectra were subsequently normalized by dividing by the sum of all intensities. A preprocessing example is shown in FIGS. 5A, 5B. FIGS. 6A, 6B show an overview of the pre-processed spectra.

Support Vector Machine (SVM) Classification

SVM classification, we used the SVC method from the python package Scikit-learn (version 1.1.1) with default parameters. 20% of the data set was held out for testing, using the train_test_split function from Scikit-learn. Prediction accuracy was determined on the test set using the accuracy_score function form Scikit-learn. For the classification of preprocessed spectra, the StandardScaler function of Scikit-learn was used to standardize the training data feature-wise (i.e., per wavenumber). Raw spectra were not normalized prior to SVM classification.

Neural Network (NN) Models

Figure 12A:
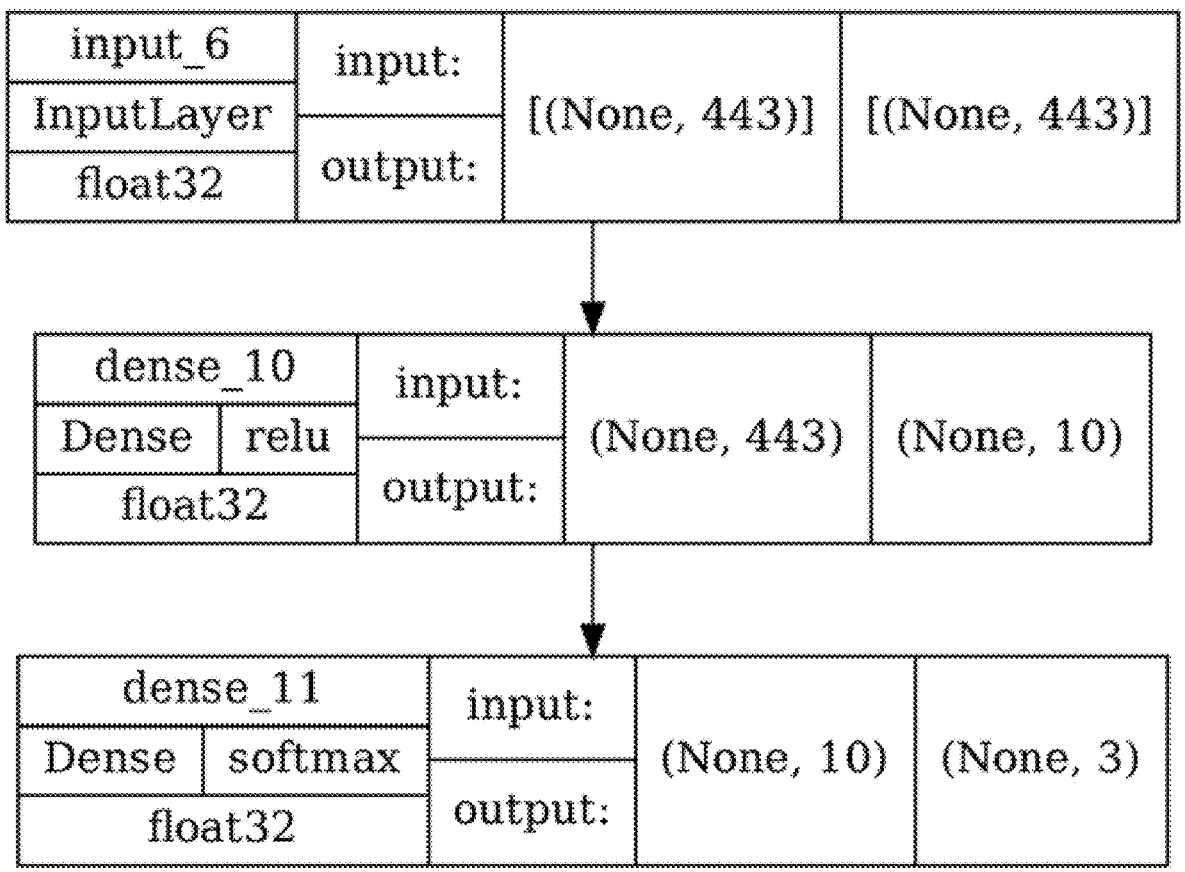
FIGS. 12A, 12B are tables illustrating features of neural network models, where
Figure 12B:
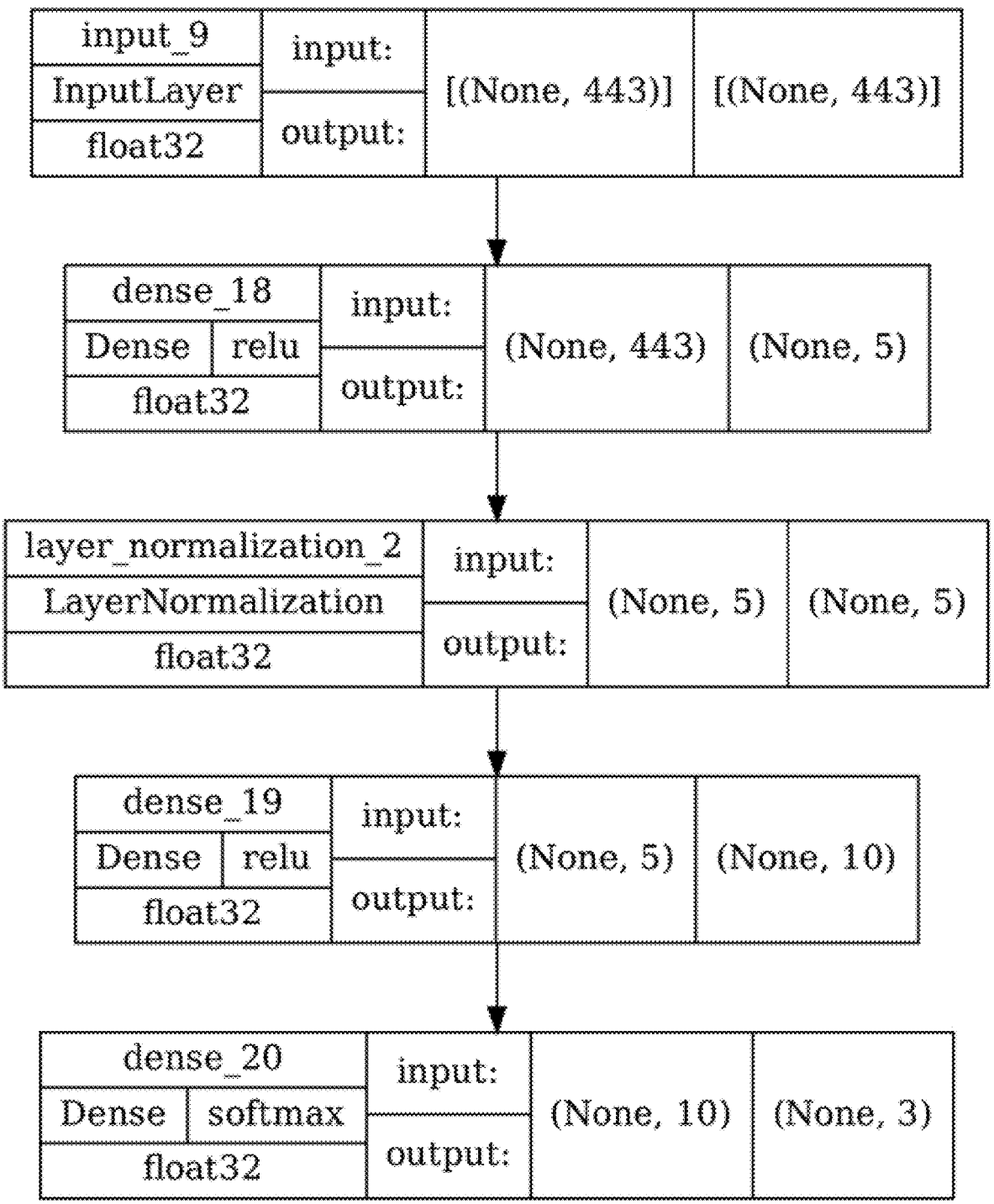

The python package tensorflow (version 2.8.0) was used to build, train, and test all NN models. The NN model for prediction of cell type labels from preprocessed spectra (model A) used 3 fully connected layers: an input layer with 443 units, where each unit corresponds to a wavenumber, a hidden layer with 10 units and ReLU activation function and an output layer with 3 units and softmax activation function (FIG. 12A). Layer weights were initialized using the default initializer. In case of the raw Raman spectra, the NN (model B) consisted of 5 layers: an input layer with 443 units, where each unit corresponds to a wavenumber; a hidden layer with N units and ReLU activation function, where each unit corresponds to a filter to be optimized; a normalization layer, which performs either batch or layer normalization; a hidden layer with 10 units and ReLU activation function and an output layer with 3 units and softmax activation function (FIG. 12B). The weights of layers 1 (input), 3 (normalization) and 5 (output) were initialized using the default initializer whereas the weights of layer 2 (first hidden layer) and layer 4 were initialized using He Uniform initialization. To impose the non-negativity constraint on the weights of the first layer we used the NonNeg constraint from tensorflow. For the binarity constraint we developed a custom constraint method:

```
import tensorflow as tf
class BinaryWeights(tf.keras.constraints.Constraint):
    def __call__(self,w):
```

-continued

```
        m = tf.reduce_mean(w,axis=0)
        ind = tf.cast(tf.math.greater(w, m),w.dtype)
        m = tf.math.divide(
    tf.reduce_sum(tf.math.multiply(w,ind),axis=0),
    tf.math.reduce_sum(ind,axis=0))
            return m*tf.cast(tf.math.greater(w, m/2),w.dtype)
```

This method first determines all weights that are larger than the mean of all weights and calculates a new mean of just those 'high' weights. Then, all weights exceeding half the mean of the high weights are set to that mean, all other weights are set to 0. This method ensures binary filter elements, but the non-zero elements are not necessarily 1. As an arbitrary scaling factor can be easily absorbed into the downstream classification model, the optical filters can be implemented with elements restricted to 0 and 1.

Prior to training, a held-out test set consisting of 20% of the data was created with the train_test_split function from Scikit-learn using stratification by classes (i.e., cell types). In case of the preprocessed Raman spectra, the training data was standardized feature-wise (i.e., per wavenumber) using the StandardScaler function of Scikit-learn prior to training model A for 20 epochs with a batch size of 32. In case of the raw spectra, there was no normalization prior to training. Model B was trained on the raw spectra for 200 epochs with a batch size of 16. For the simulated spectra, 20 epochs and a batch size of 128 were used.

For each set of parameters (number of units N in the first hidden layer, type of normalization on the normalization layer and constraint on the weights in the first hidden layer), the model was trained on 5 different train-test splits. For each split the model was trained 3 times and the best performing model was selected and reported in FIG. 3. To obtain a model with binary weights in the first hidden layer, model B was first trained with a non-negativity constraint on the weights in the first hidden layer. The weights of the resulting model were then copied to a new network with identical architecture but a binarity constraint on the weights in the first hidden layer. Training of this new model on the same train-test split resulted in the final model with binary weights in the first hidden layer. Sparse categorical cross entropy was used as the loss function in all cases and all models were trained using stochastic gradient descent with a learning rate of 0.01.

Simulations

Raman spectra were simulated using conventional techniques. Intensities for K=50 wavenumbers k were drawn from an exponential probability density with unit mean, raised to the power $\alpha=3$ and subsequently divided by the sum of all intensities, for normalization.

To create spectra $s_j$ for M=3 molecular species with controllable levels of correlation, we first simulated M+1 spectra $r_j$ and defined spectrum M+1 as the 'common' spectrum. To create correlated spectra $s_j$, linear combinations of the spectra $r_j$ were calculated:

$$s_{jk} = (1-\beta)r_{jk} + \beta r_{(M+1)k}$$

$$\text{with } j \in \{1, \ldots, M\}$$

$$k \in \{1, \ldots, K\}$$

$$\beta \in [0, 1]$$

Figure 10A:
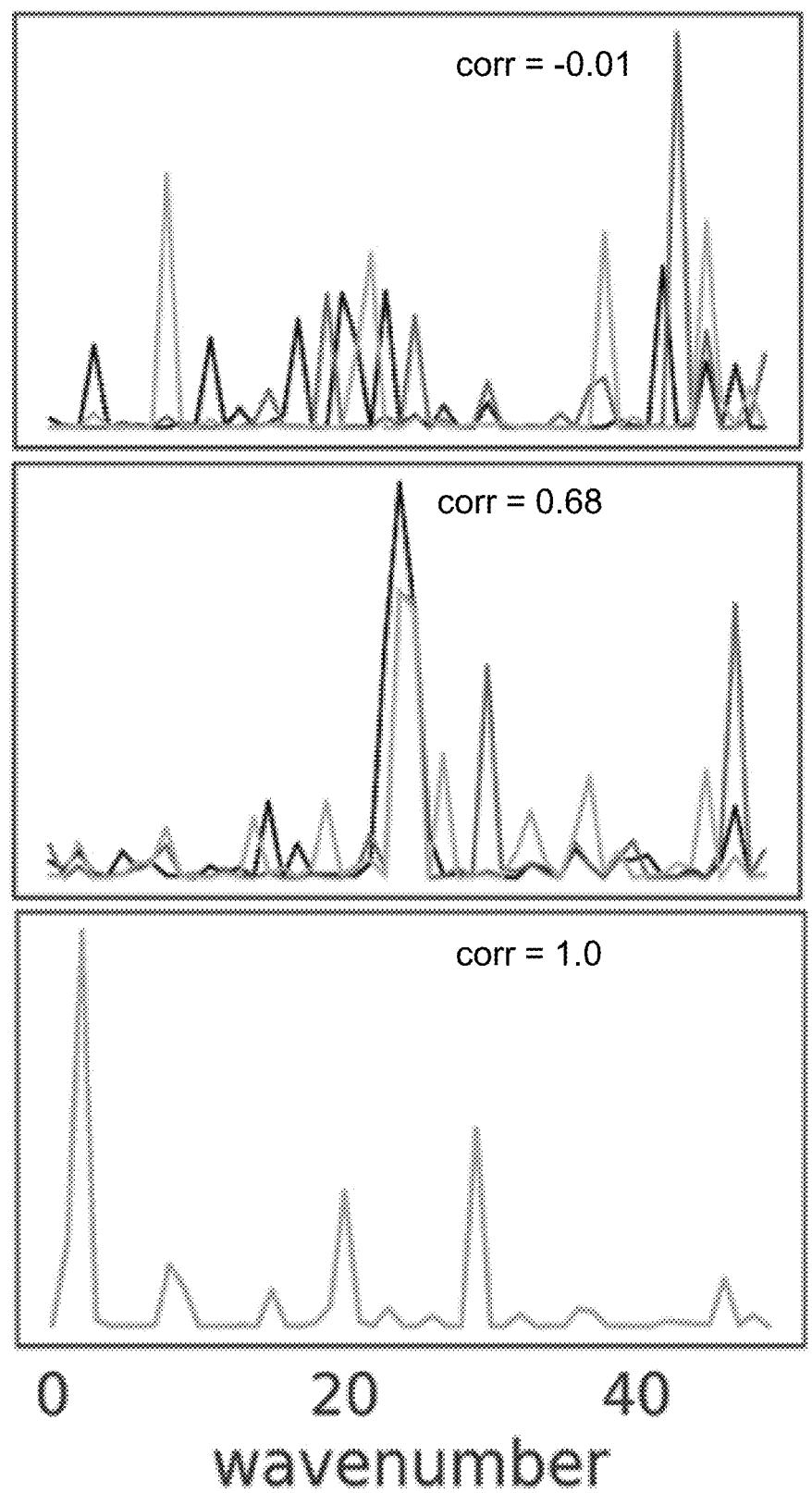
FIGS. 10A, 10B, 10C, 10D are graphs illustrating that Bhattacharyya bound-based optimization and neural network model perform similarly on simulated data, where

For β=1, all 3 spectra are identical to the common spectrum, for β=0 the spectra are independent random variables (see FIG. 10A,B).

To simulate photon counting noise on a spectrum, photon numbers ν were drawn randomly from a multinomial distribution with the distribution parameters given by the normalized spectral intensities $s_{jk}$ and a total number of photons $N_{phot}$:

$$P(v \mid s_j, N_{phot}) = N_{phot}! \prod_{k=1}^{K} \frac{s_{jk}^{v_k}}{v_k!}$$

$$\text{where } N_{phot} = \sum_{k=1}^{K} v_k$$

$$v = [v_1, \ldots, v_K]$$

$$s_j = [s_{j1}, \ldots, s_{jK}]$$

$$j \in \{1, \ldots, M\}$$

For training and testing the neural network model, 10000 samples were drawn from this distribution for each molecular species, where each sample is a complete spectrum with noise. The split into training and test set as well as the hyperparameters used for training the NN are described in the previous section.

To simulate counting noise after a filter, first the filter outputs $\mu_{ij}$ were calculated as the dot product between a filter $F_i$ and a spectrum $s_j$:

$$\mu_{ij} = \sum_{k=1}^{K} F_{ik} s_{jk}$$

$$\text{where } F_{ik} \in \{0, 1\}$$

$$i \in \{1, \ldots, N\}$$

$$j \in \{1, \ldots, M\}$$

Since the spectra are normalized and each filter element is binary (either 0 or one 1), $\mu_{ij}$ is the fraction of transmitted signal intensity, i.e., the optical efficiency, of filter i for molecular species j. To simulate photon counting noise on a filter output, photon numbers n were drawn randomly from a multinomial distribution with the distribution parameters given by the normalized filter outputs $p_{ij}$ and a total number of photons $N_{phot}$:

$$p_{ij} = \frac{\mu_{ij}}{\sum_{i=1}^{N} \mu_{ij}}$$

$$P(n \mid p_j, N_{phot}) = N_{phot}! \prod_{i=1}^{N} \frac{p_{ij}^{n_i}}{n_i!}$$

$$\text{where } N_{phot} = \sum_{i=1}^{N} n_i$$

$$n = [n_1, \ldots, n_N]$$

$$p_j = [p_{1j}, \ldots, p_{Nj}]$$

$$j \in \{1, \ldots, M\}$$

Note that it is entirely equivalent to introduce photon counting noise before or after a filter since a linear combination of multinomial-distributed random variables is again multinomial-distributed. Since the filters we find by Bhattacharyya bound (BB)-based optimization (see next section) have an approximate optical efficiency of 1%, spectra simulated with $N_{phot}$ photons are equivalent to filter outputs simulated with 0.01 $N_{phot}$ photons.

Bhattacharyya Bound-Based Optimization of Filters

Réfrégier et al. ("Bhattacharyya bound for Raman spectrum classification with a couple of binary filters." *Opt Lett* 44, 2228 (2019), "Compressed Raman classification method with upper-bounded error probability." *Opt Lett* 44, 5836 (2019)) developed compressive Raman classification based on the principle of maximum likelihood. In short, a measurement of photon numbers n for the output of N filters is classified by finding the spectrum that had the biggest likelihood of giving rise to that measurement:

$$j_{pred} = \underset{j}{\mathrm{argmax}} \log[P(n \mid p_j, N_{phot})]$$

The Bhattacharyya (BB) bound is an upper bound of the classification error, which has the following form for multinomial (i.e., photon counting) noise:

$$BB_{multinomial} = \frac{1}{2M} \sum_{j=1}^{M-1} \sum_{j'=j+1}^{M} \left( \sum_{i=1}^{N} \sqrt{p_{ij} \cdot p_{ij'}} \right)^{N_{phot}}$$

This expression is valid, if each class is equally frequent. As shown by Réfrégier et al., filters can be optimized by minimizing the BB bound. The optimization algorithm starts with a set of random filters and attempts 'flips' of filter elements from 0 to 1 or 1 to 0. Such flips are accepted if they reduce the BB bound. If the only objective is a minimal BB bound, the resulting filters might have only a few non-zero elements, which corresponds to low optical efficiency. Adding a certain optical efficiency as another objective requires makes the optimization more challenging. Instead, here we initialize each filter with ⅓ of their elements set to 1 and instead of flipping individual elements, we attempt to swap a randomly chosen 0 with a randomly chosen 1 from the same filter, which preserves the fraction of non-zero elements. A swap is accepted if it reduces the BB bound. We found that this algorithm converged quickly and led to filters with approximately 1% optical efficiency. To make a fair comparison between the BB-based optimization and the NN model, we did not require filters to be orthogonal, which would likely reduce the achievable classification accuracy. The actual classification error or accuracy of optimized filters was then obtained by classifying simulated filter outputs, where photon counting noise was introduced at the level of the filters.

To apply BB-based optimization to the measured Raman spectra of cells, we had to adapt the scheme developed by Réfrégier et al. In contrast to measurements of simple molecules, the variability between spectra of the same class (i.e., cell type) is not sufficiently described by (multinomial) photon counting noise or other measurement noise with a simple distribution. The BB given above is therefore not appropriate. Instead, we made the assumption that filter outputs are normally distributed, since a closed-form expression for the BB exists in that case. Means and covariance matrices of filter outputs were estimated from all the $N_{data,j}$ spectra of cell type j in the data set:

$$\mu_{ij}^{(l)} = \sum_{k=1}^{K} F_{ik} s_{jk}^{(l)}$$

$$m_{ij} = \langle \mu_{ij} \rangle = \frac{1}{N_{data,j}} \sum_{l=1}^{N_{data,j}} \mu_{ij}^{(l)}$$

$$m_j = [m_{1j}, \ldots, m_{N_j}]^T$$

$$\Sigma_{ii'j} = \frac{1}{N_{data,j}} \sum_{l=1}^{N_{data,j}} (\mu_{ij}^{(l)} - m_{ij})(\mu_{i'j}^{(l)} - m_{i'j})$$

$$\Sigma_j = \begin{bmatrix} \Sigma_{11j} & \cdots & \Sigma_{1Nj} \\ \vdots & \ddots & \vdots \\ \Sigma_{N1j} & \cdots & \Sigma_{NNj} \end{bmatrix}$$

where the superscript (l) indexes the measured samples. In the case of normally distributed noise, the BB is given by $$BB_{normal} = \frac{1}{2M} \sum_{j=1}^{M-1} \sum_{j'=j+1}^{M} \sqrt{P_j P_{j'}} \, e^{-d(j,j')}$$

$$\text{where } P_j = \frac{N_{data,j}}{\sum_{j=1}^{M} N_{data,j}}$$

$$d(j, j') = \frac{1}{8}(m_{j'} - m_j)^T \left( \frac{\Sigma_j + \Sigma_{j'}}{2} \right)^{-1} (m_{j'} - m_j)$$

$$+ \frac{1}{2} \log \frac{\left| \frac{\Sigma_j + \Sigma_{j'}}{2} \right|}{\sqrt{|\Sigma_j||\Sigma_{j'}|}}$$

As the numbers of spectra from different cell types $N_{data,j}$ are not equal, this expression contains the probabilities $P_j$ that a random sample from the data set belongs to cell type j.

The same optimization algorithm as above was used, albeit with the BB for normally distributed filter outputs. The actual classification error or accuracy of optimized filters was then obtained by maximum likelihood classification of measured spectra:

$$j_{pred} = \underset{j}{\mathrm{argmax}} \log \left[ P(\mu | m_j, \Sigma_j) \right]$$

$$\text{where } \mu = [\mu_1, \ldots, \mu_N]$$

$$\mu_i = \sum_{k}^{K} F_{ik} s_k$$

$$P(\mu | m_j, \Sigma_j) = P_j \mathcal{N}(\mu; m_j, \Sigma_j)$$

where s is a measured spectrum, m the corresponding filter output and $N(\mu; m_j, \Sigma_j)$ a multivariate normal distribution with means $m_j$ and covariance matrix $\Sigma_j$.

Validation Results

We first set out to explore the usefulness of Raman spectroscopy for cell classification. We studied the Raman intensities in a 'fingerprint region' between 320 cm$^{-1}$ and 1800 cm$^{-1}$. Since the raw spectra are strongly overlapping between the different cell types (FIGS. 2A, 2B) we adopted standard preprocessing steps to remove a slowly varying baseline and normalize the spectra (FIGS. 5A, 5B). Preprocessing reduced, but not eliminated, the overlap of the spectra (FIGS. 6A, 6B). Given that the average spectra of different cell types were quite similar (0.97 mean pairwise Pearson correlation), one might expect classification of individual measurements to be hard. On the contrary, both a support vector machine (SVM) and a multilayer perceptron, a simple neural network (NN), were able to classify the cells with 91% and 90% accuracy, respectively. Most of the misclassifications were due to the confusion of NSCs and Neurons (FIG. 7A), which might indicate that these cell types are biochemically more similar to each other than to iPSCs. This is supported by low-dimensional embeddings of the Raman spectra (FIG. 7B), where iPSCs are largely separate from the other cell types. Most misclassifications occur where spectra from different cell types are close to each other in the embedding space. In summary, properly preprocessed, complete Raman spectra can be easily classified as belonging to different cell types using simple supervised learning methods.

FIGS. 2A, 2B show that raw Raman spectra of iPSCs, NSCs and Neurons are strongly overlapping. FIG. 2A is a graph of Raman intensities for different cell types before preprocessing. The data set contains 3850 spectra from iPSCs, 2342 from NSCs and 3116 from Neurons. The solid lines show the median per cell type for each wavenumber. The error bands indicate mean absolute deviations calculated separately for positive and negative deviations. FIG. 2B is a graph of mean intensities of individual Raman spectra before preprocessing.

Figure 8:
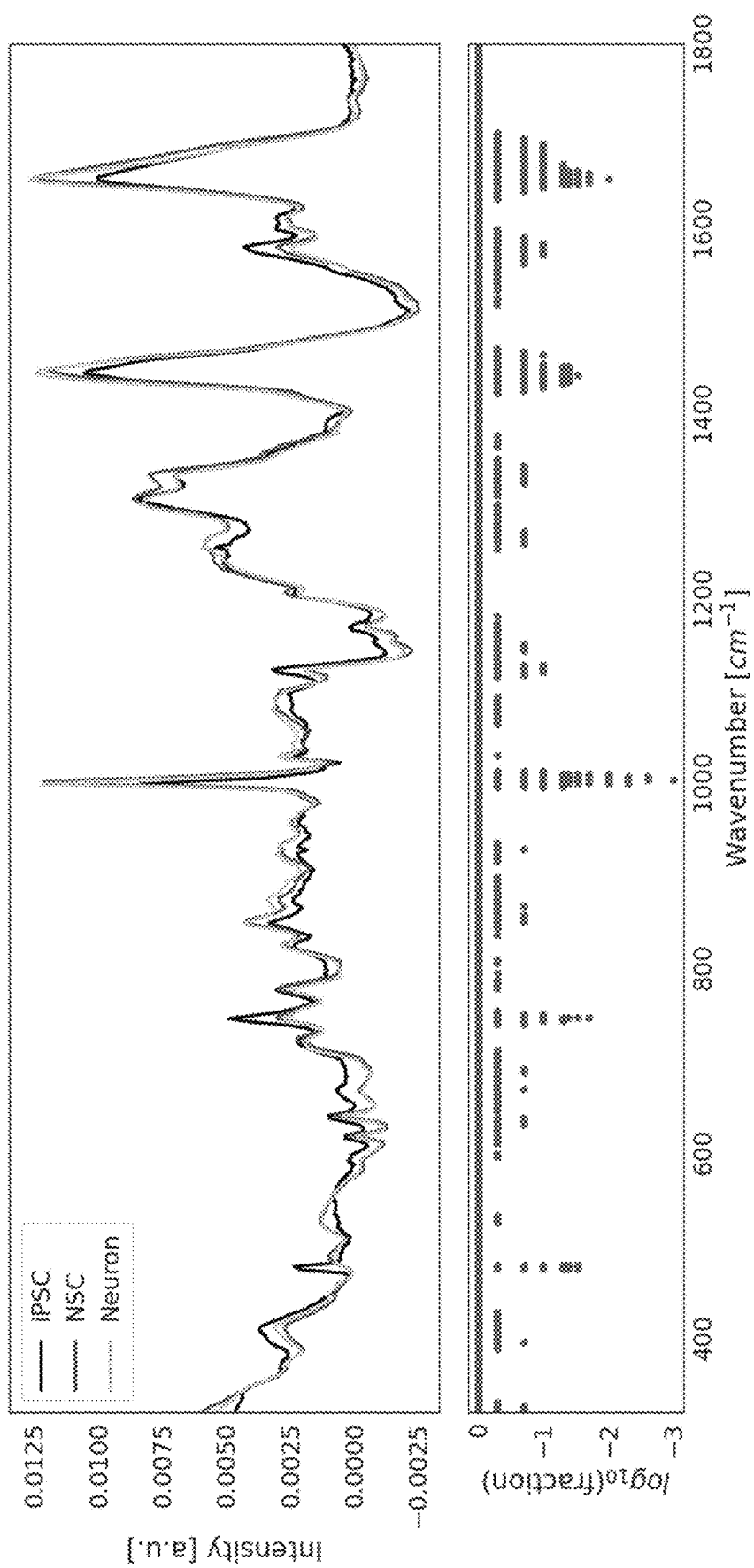
FIG. 8 shows graphs illustrating that most informative Raman intensities are selected by variability across cell types.
Figure 9:
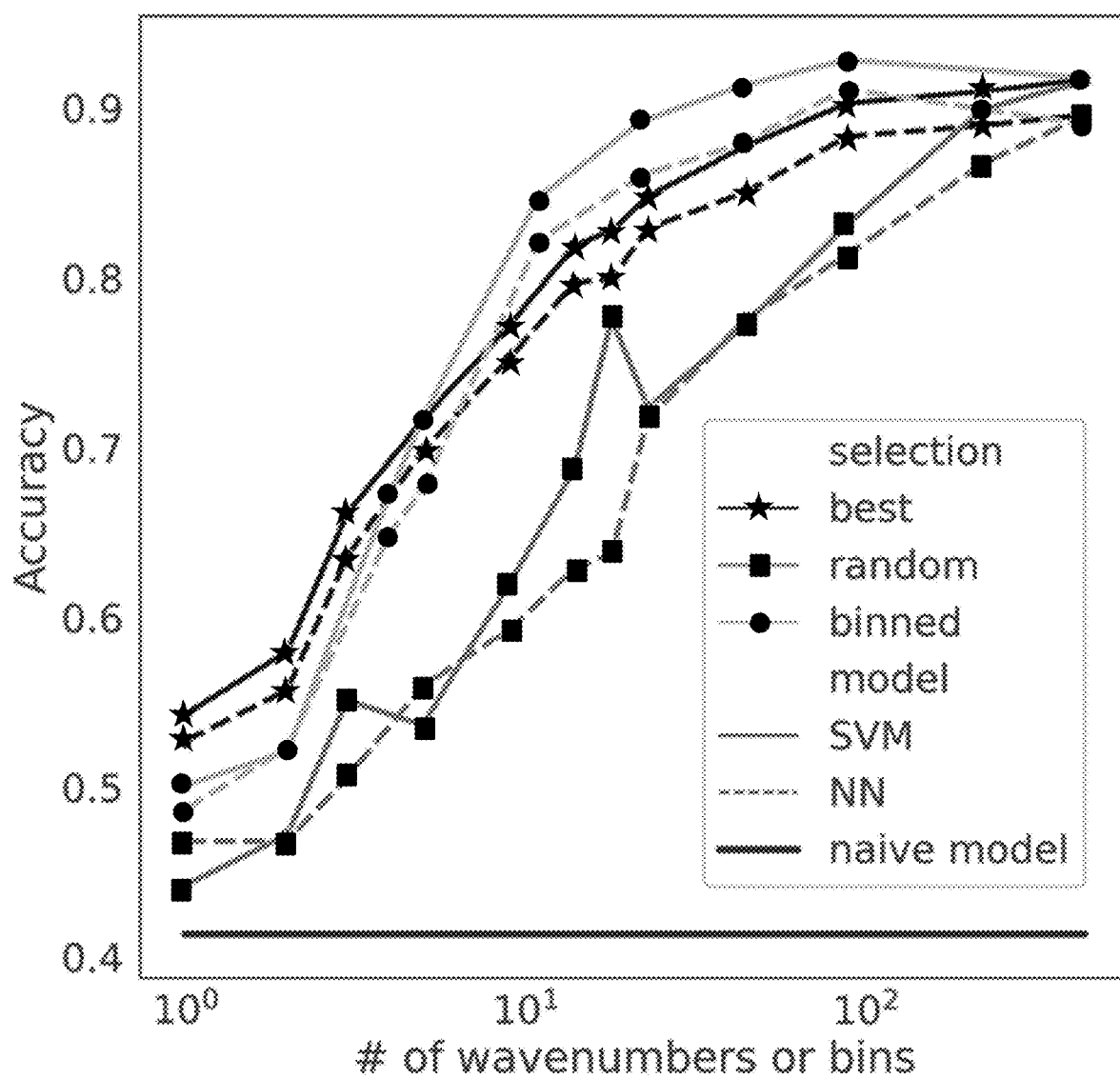
FIG. 9 is a graph of accuracy vs number of wavenumber bins, illustrating how, for training on preprocessed spectra, classification accuracy increases with the number of included wavenumbers or wavenumber bins.

Next, we wanted to establish how much information from a Raman spectrum should be used to achieve high classification accuracy. We first restricted the input data to subsets of Raman intensities, either by choosing them randomly or picking the intensities with the largest variability across cell types (FIG. 8). SVM and NN showed very similar performance, which declined with a reduction in the number of data points used for learning (FIG. 9). When points were chosen randomly, accuracy was overall lower and declined more rapidly with the number of used intensities. For comparison, we also tested a simple binning scheme, where intensities were averaged within equally sized intervals. Surprisingly, training on binned spectra resulted in superior performance, compared to using the most variable intensities, from 10 bins upwards and only slightly smaller accuracy below 10 bins. Averaging within intervals likely mitigates technical noise corrupting individual intensities. Taken together, we established that feature selection and averaging both have a positive impact on classification performance. Compressive sensing with optimal filters essentially combines both of these aspects and should therefore be able to achieve accurate classification.

We reasoned that an NN would be the most convenient model to use for compressive sensing as it allows us to do feature selection (i.e., the design of optimal filters) and train the downstream classification model at the same time. Calculating the activation of a unit in the first hidden layer of the NN involves computing the dot product of the input (a Raman spectrum) and the weights of the unit. That is mathematically equivalent to taking a compressive Raman measurement with an actual optical filter. This observation is the basis for the suggested approach, which consists of 3 phases (FIGS. 1A, 1B, 1C). In the training phase, we optimize the weights of an NN classification model using complete, raw Raman spectra labeled with cell types or states. In the implementation phase we would create separate optical filters for each unit in the first hidden layer. The frequency response of each filter is given by the weights of the corresponding unit, since each individual weight is multiplied with a specific intensity in an input Raman spectrum. The prediction phase would consist of compressive Raman measurements, which replace the input layer and the dot products of spectra with weights in the original NN model. Via the remaining layers of the NN, each measurement, which must include all identified filters, would then lead to a prediction of a cell's label.

As the compressive measurements will be used as inputs to the NN model, we cannot use any preprocessing based on knowledge of complete spectra (as in FIG. 5A, 5B). However, efficient learning of an NN model typically requires normalized data. Hence, we included a normalization layer after the first hidden layer of the NN and tested two common normalization strategies: batch normalization and layer normalization. Another complication arises from the fact that binary optical filters are easier to implement than filters with continuously varying frequency response. Consequently, we wanted to add the constraint that the weights of the first hidden layer are binary. Empirically we found that training an NN directly with such a constraint is usually unsuccessful. Instead, we first trained an NN requiring non-negative weights in the first hidden layer. Starting from this pre-trained network we then introduced the binarity constraint. Finally, we wanted to study, how many optimal filters (i.e., units in the first hidden layer) are necessary to achieve acceptable classification accuracy. Overall, layer normalization gave better results than batch normalization for 4 or more filters (FIG. 3). Interestingly, for 5 or more filters, model performance was not reduced by the binarity constraint, if layer normalization was used. The model with binary weights likely benefited from the additional training epochs (starting from the pre-trained network with non-negative weights) and the binarity constraint might also effectively regularize the network. Model performance increased with the number of filters up to 50 filters after which it declined and became more variable. Possibly, using more filters introduces additional noise which might outweigh any advantage if classification accuracy is already high. Also, the capacity of the NN increases with the number of units in the first hidden layer, which might lead to a higher variance of the model and therefore worse generalization. Most importantly, using layer normalization and binary weights in the first hidden layer, only 4 filters were necessary to achieve up to 87% classification accuracy and 5 filters resulted in up to 91% accuracy. The model thus achieves a similar accuracy to the models using all 443 Raman intensities (FIGS. 7A, 7B). Notably, even with only 3 filters, the NN model is more accurate than an SVM trained on complete, raw Raman spectra. All in all, our results indicate that only 4 to 5 compressive measurements with optimized filters should be sufficient for accurate classification. This would reduce measurements time by two orders of magnitude compared to the acquisition of complete Raman spectra.

FIG. 3 is a graph of accuracy vs. number of filters, illustrating how just 4 or 5 compressive measurements are sufficient to classify cell types with high accuracy. The graph shows accuracy on held-out test sets for a neural network (NN) model with different numbers of units in the first hidden layer of the NN (=#filters) or the Bhattacharyya bound (BB) based optimization with different numbers of filters. Two different constraints on the weights in the first hidden layer were used (either 'non-negative' or 'binary') as well as two types of normalization ('layer' or 'batch' normalization) after the first hidden layer. The 5 data points shown for each choice of parameters (#filters, constraint, normalization) correspond to 5 different splits of the data into training and test set for the NN model. For the BB model, the optimization was run 5 times on the complete data set. The dashed horizontal line indicates the accuracy of a support vector machine trained on raw, unnormalized Raman spectra and the solid horizontal line corresponds to a naïve model that always predicts the most frequent class.

Figure 10C:
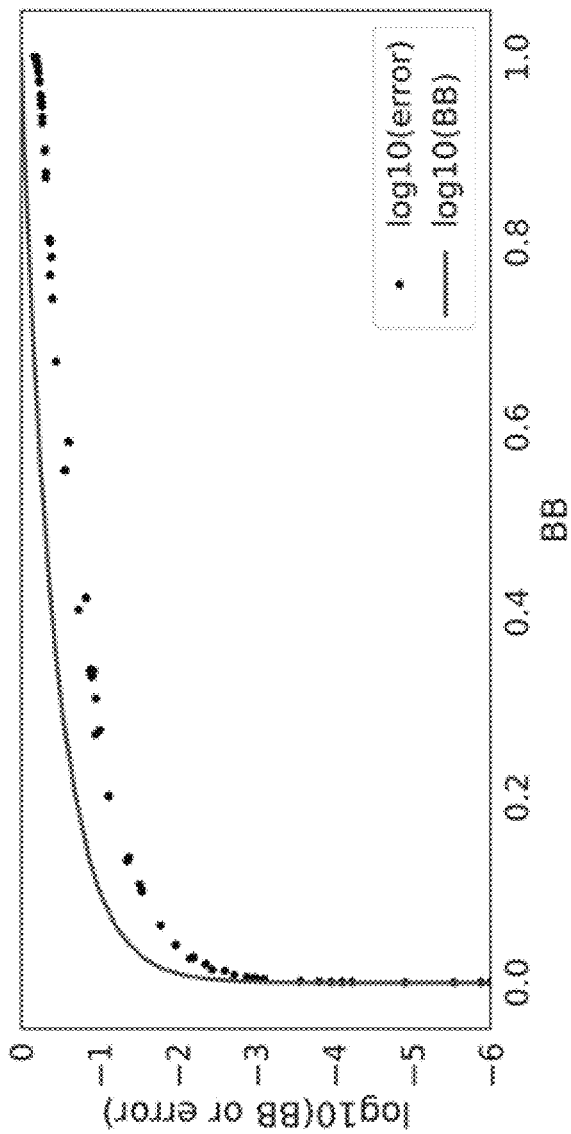
Figure 10B:
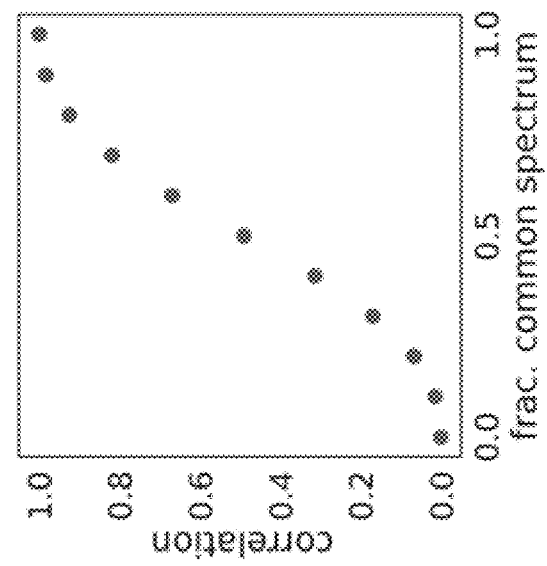
Figure 10D:
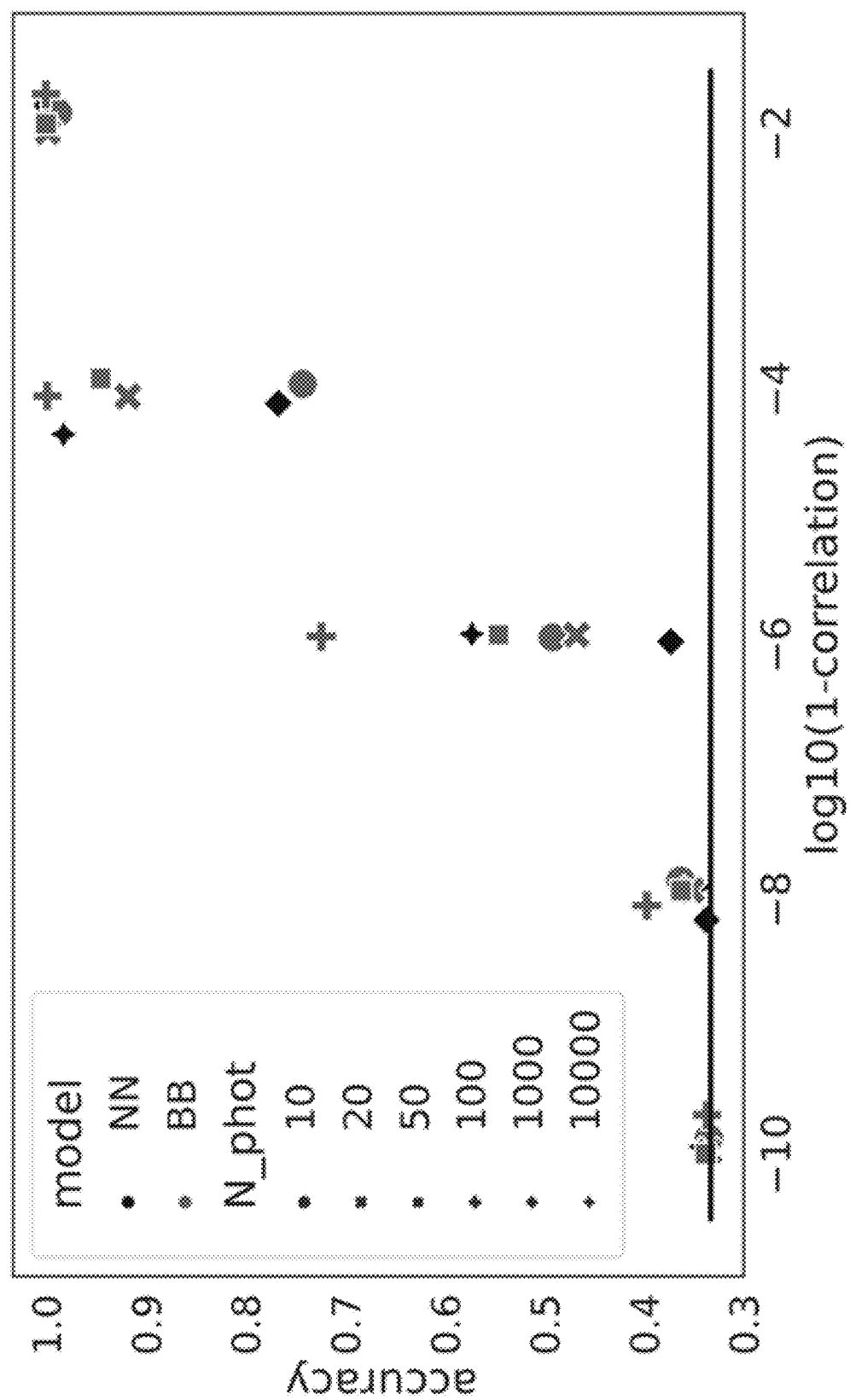

Next, we compared our NN model to the current state-of-the-art filter optimization method, which is based on minimizing an upper bound of the maximum likelihood classification (MLC) error, the Bhattacharyya bound (BB). We first simulated Raman spectra with various levels of correlation assuming photon counting noise as the only source of variability (FIGS. 10A, 10B). We adapted an optimization algorithm described by Refrégier et al. and confirmed that the achieved classification error was below the BB (FIG. 10C). Across simulated spectra with various levels of correlation, our NN model was comparable in performance to MLC with filters optimized by minimizing the BB (FIG. 10D). Since the published filter optimization algorithm assumes multinomially distributed noise, it produced very poor classification accuracy of around 0.4 when applied to the measured Raman spectra of cells. We hence extended the BB-based optimization algorithm by assuming normally distributed filter outputs and estimating the parameters of the multivariate normal distribution from the data. The MLC accuracy of the resulting filters was markedly increased, but still outperformed by our NN model (FIG. 3).

Figure 4A:
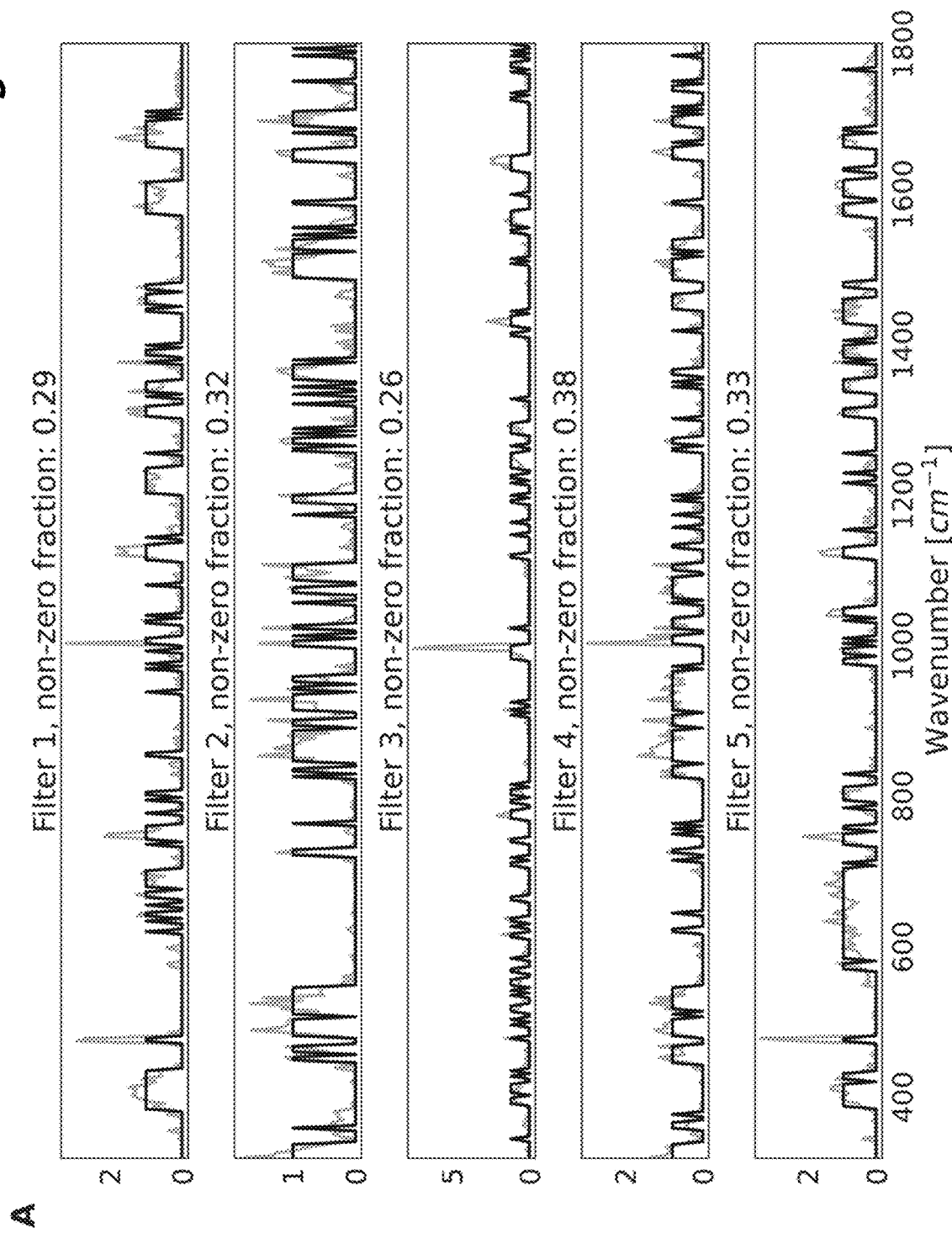
FIGS. 4A, 4B are graphs that illustrate that the output patterns of 5 optimal filters encode the cell types, where
Figure 4B:
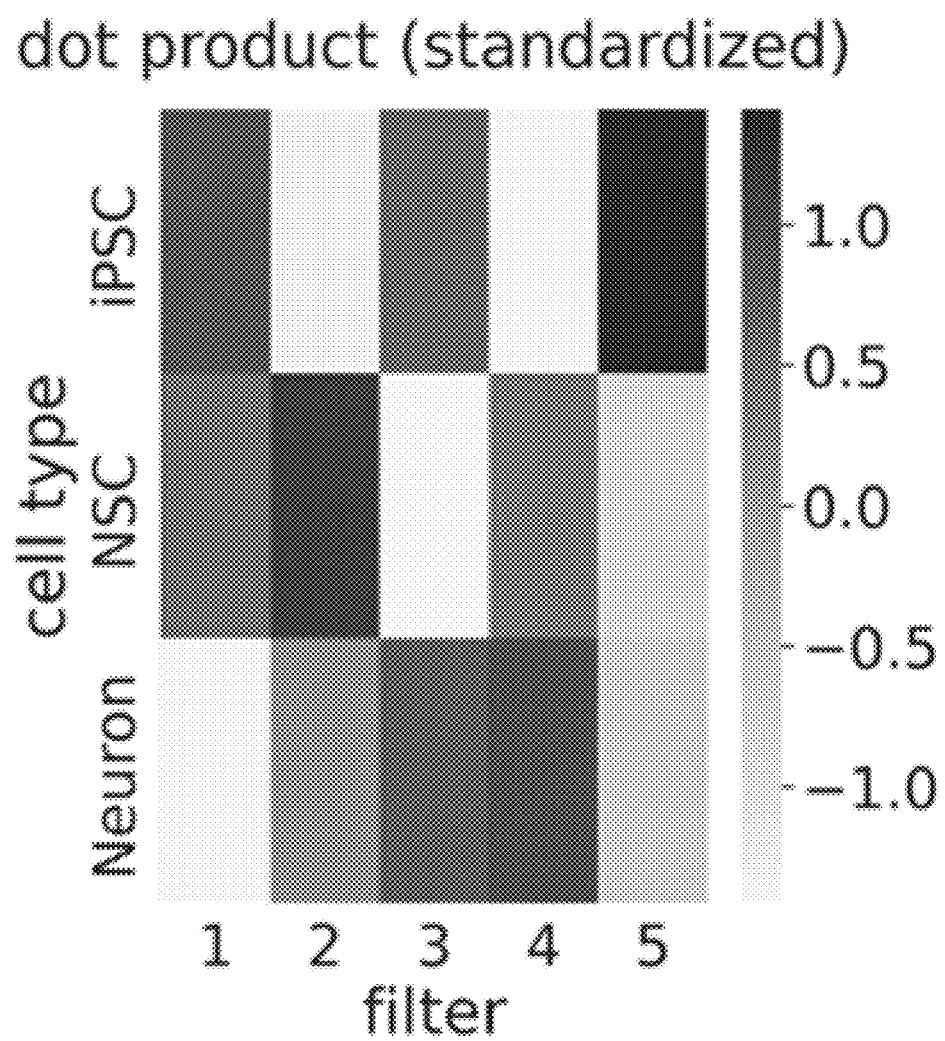

FIGS. 4A, 4B illustrate that the output patterns of 5 optimal filters encode the cell types. FIG. 4A shows graphs of weight magnitude vs wavenumber index, showing weights learned by the model under the constraint to be non-negative or binary. The fraction of non-zero weights was calculated for the binary filters. FIG. 4B shows a graph of dot products of the 5 filters and raw Raman spectra averaged per cell type and subsequently standardized filter- and cell type-wise.

Figures 11A, 11B, 11C:
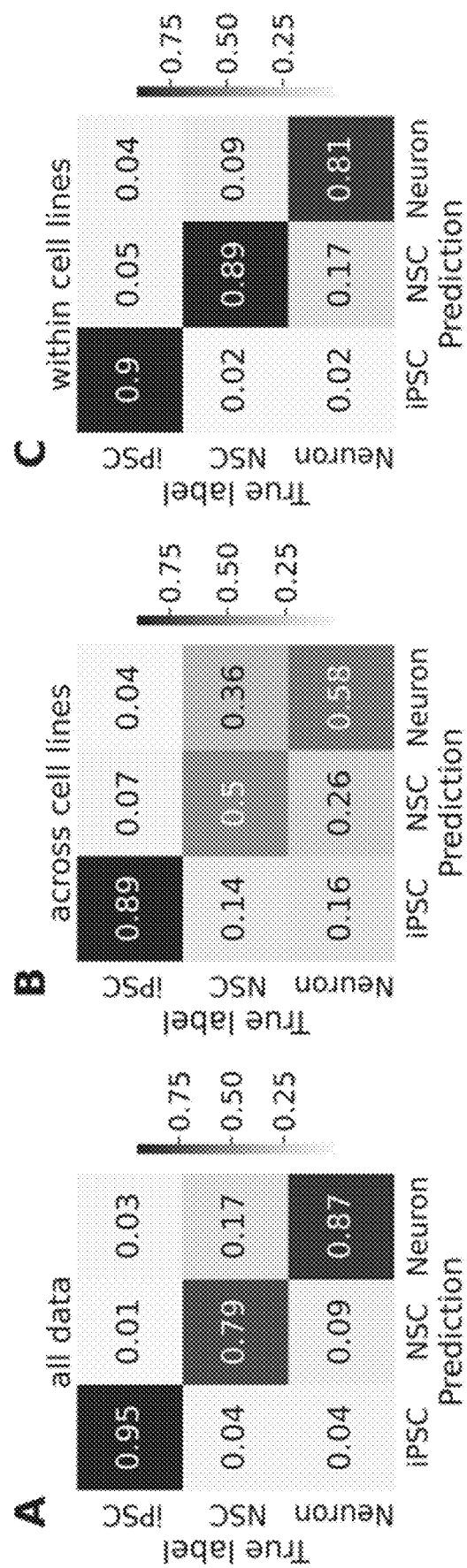
FIGS. 11A, 11B, 11C, 11D are graphs illustrating how biological variability impacts prediction accuracy, showing confusion tables for training and testing using all data (FIG. 11A), training using 2 cell lines and predicting the third (FIG. 11B), and training and testing with cells from the same cell line (FIG. 11C), and where

Since using 10 instead of 5 filters in the NN model improved accuracy only by another 2%, we considered the 5 filter-model the optimal trade-off between accuracy and the number of necessary filters. Hence, we decided to further characterize that model (FIGS. 4A, 4B) and compare different training scenarios. Inspection of the weights of this model showed that the binary weights closely follow the non-negative weights of the pretrained model (FIG. 4A). That might explain why there is usually no decline in accuracy when the binarity constraint is imposed. Inspection of the dot products of spectra and weights of the 5 filters showed that each cell type activated a different subset of filters (FIG. 4B). That effectively defines a simple encoding of the 3 cell types. Two of the 5 filters had very similar activation patterns, which might indicate that one of them is almost redundant. That can explain why a model with 4 filters is only slightly less accurate than the model with 5 filters. When trained on all available data, test accuracy exceeded 90% and confusion was biggest between neurons and NSCs (FIG. 11A), as for the models based on complete spectra (FIG. 7A). We also wanted to study, in how far biological variability, as manifested in differences between cell lines, for example, could impair classification performance. We therefore trained a model with 5 filters on 2 of the 3 cell lines in the data set and predicted cells derived from the third cell line. Classification accuracy was only 69% and confusion between neurons and NSCs was more frequent compared to using all available data (FIG. 11B). For comparison, we trained a 5-filter model on cells from one cell line only and tested it on a held-out population from the same line. In that case, accuracy was up to 94% (87% on average) and confusion was less frequent than for predictions across cell lines (FIG. 11C). All in all, we observed that biological variability impacts classification accuracy but its effects can be completely mitigated, if representative training data is used. Finally, we wanted to test, if the spectral resolution of the optical filter device would have a large influence on classification accuracy. To that end we trained NN models with 5 filters on measured spectra averaged within equally sized intervals. Surprisingly, accuracy declined only slightly with increased bin size and was still >80% when only 44 wavenumber bins were used for training. The NN model thus produces useful filters even if the spectral resolution of the filters is substantially reduced.

Herein we have described a neural network approach for the design of optimal filters for compressive Raman classification. The approach was tested in a data set comprising three different cell types. We demonstrated that the smallest NN model that delivered high classification accuracy (>90%) required only 5 filters.

In the example described above we trained our model on an iPSC differentiation experiment. Such a model could be immediately useful to assess proper differentiation prior to the application of the derived cells. Likewise, the model could be trained on reprogramming cells and used to assess reprogramming status.

The example implementation described above is for illustrative purposes. The techniques of the present invention can be implemented in various alternative ways. For example, we envision multiple computational and experimental variations. On the computational side, embodiments of the invention may include adding information about the baseline, and providing additional filters that can predict baselines from raw spectra. If desired, embodiments may include in the model definition an additional loss term that penalizes zero filter elements. Additionally, embodiments may include constraining the filters to be orthogonal, so that compressive measurements can occur in parallel. On the experimental side, embodiments may include techniques for the reduction of measurement noise. We showed above that a simple binning scheme improved classification performance. Accordingly, embodiments may include combining multiple point measurements of a single cell or collecting signal from a larger volume.

FIGS. 5A, 5B are graphs of measured intensity vs wavenumber, illustrating how preprocessing removes a slowly varying baseline and normalizes spectra. FIG. 5A shows a baseline calculated by asymmetric least-squares smoothing is subtracted from the raw measurement. FIG. 5B shows the baseline-corrected measurement shown is normalized to the sum of intensities over all considered wavenumbers.

FIGS. 6A, 6B are graphs of intensity vs. wavenumber illustrating how preprocessing (baseline removal and normalization) reduces, but does not eliminate, overlap of Raman spectra. The solid lines show the medians per cell type. Error bands indicate mean absolute deviation calculated separately for positive and negative deviations. FIG. 6A shows the complete fingerprint region. FIG. 6B shows a magnified portion of the graph from 319 $cm^{-1}$ to 673 $cm^{-1}$.

Figure 7A:
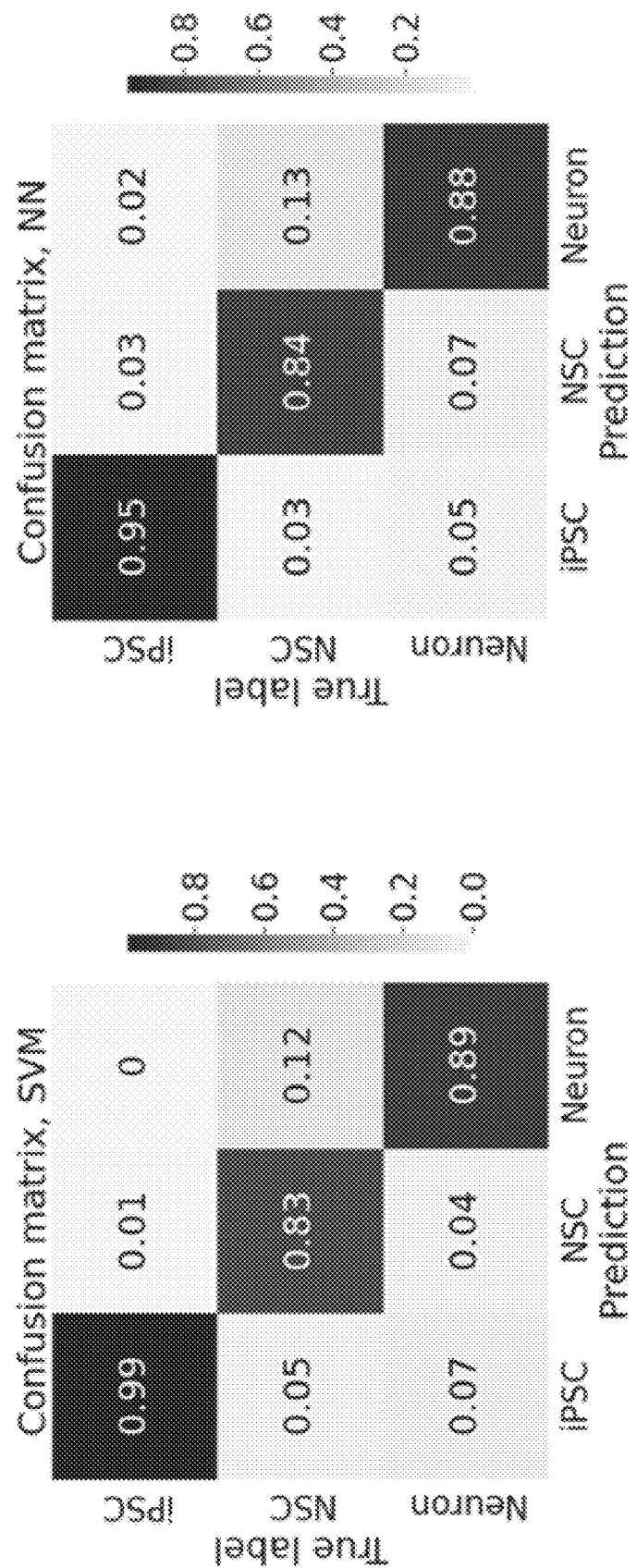

FIGS. 7A, 7B are graphs showing support vector machine and neural network classify cell types with high accuracy. FIG. 7A shows confusion tables of the SVM or NN classification of held-out test data. FIG. 7B shows two-dimensional embeddings of the data. The first row shows the data projected on the first two principal components. The second row shows a two-dimensional t-distributed stochastic neighbor embedding (t-SNE). The second and third columns show only the test samples with the samples wrongly predicted by the SVM or NN highlighted.

FIG. 8 shows graphs illustrating that most informative Raman intensities are selected by variability across cell types. Top: Average Raman spectra for each cell type. Bottom: Wavenumbers with the most variable intensity across average spectra (standard deviation). The fraction of included wavenumbers is indicated on the y-axis.

FIG. 9 is a graph of accuracy vs number of wavenumber bins, illustrating how, for training on preprocessed spectra, classification accuracy increases with the number of included wavenumbers or wavenumber bins. Accuracy on a held-out test set of for the support vector machine (SVM) or neural network (NN) model trained on preprocessed complete or subsetted spectra. For the results labeled 'best' or 'random', a subset of wavenumbers was chosen either based on the most variable wavenumbers ('best') or randomly ('random'). For the results labeled 'binned' Raman intensities were binned in equally sized wavenumber bins and averaged. The horizontal line indicates the accuracy of a naive model that always predicts the most frequent class.

FIGS. 10A, 10B, 10C, 10D are graphs illustrating that Bhattacharyya bound-based optimization and neural network model perform similarly on simulated data.

FIG. 10A shows examples of simulated spectra for 3 species with different levels of Pearson correlation (corr). FIG. 10B shows correlation between spectra versus the fraction of a shared, 'common' spectrum. Spectra of 3 species were created by simulating 4 spectra and defining one as a 'common' spectrum. To create correlation, a linear combination was calculated: (1−b)*spectrum+b*common spectrum, where b is the fraction reported on the x-axis. For b=1, all 3 spectra are identical, for b=0 the spectra are created from independent random processes. FIG. 10C shows Bhattacharyya bound (BB) and classification error of BB-based optimization for various levels of correlation and numbers of photons. The achieved error was always smaller than the BB bound. FIG. 10D shows classification accuracy for the NN model or BB-based optimization for different correlations between the spectra and numbers of photons ($N_{phot}$). For the BB-based optimization, $N_{phot}$ refers to the number of photons after the filter, for the NN model, it refers to the number of photons from the complete spectrum, before the filter. As the filters created by BB-based optimization have an approximate optical efficiency of 1% in our simulations, 1000 photons for the BB-based optimization are equivalent to 10000 photons for the NN model.

FIGS. 11A, 11B, 11C, 11D are graphs illustrating how biological variability impacts prediction accuracy.

Figure 11D:
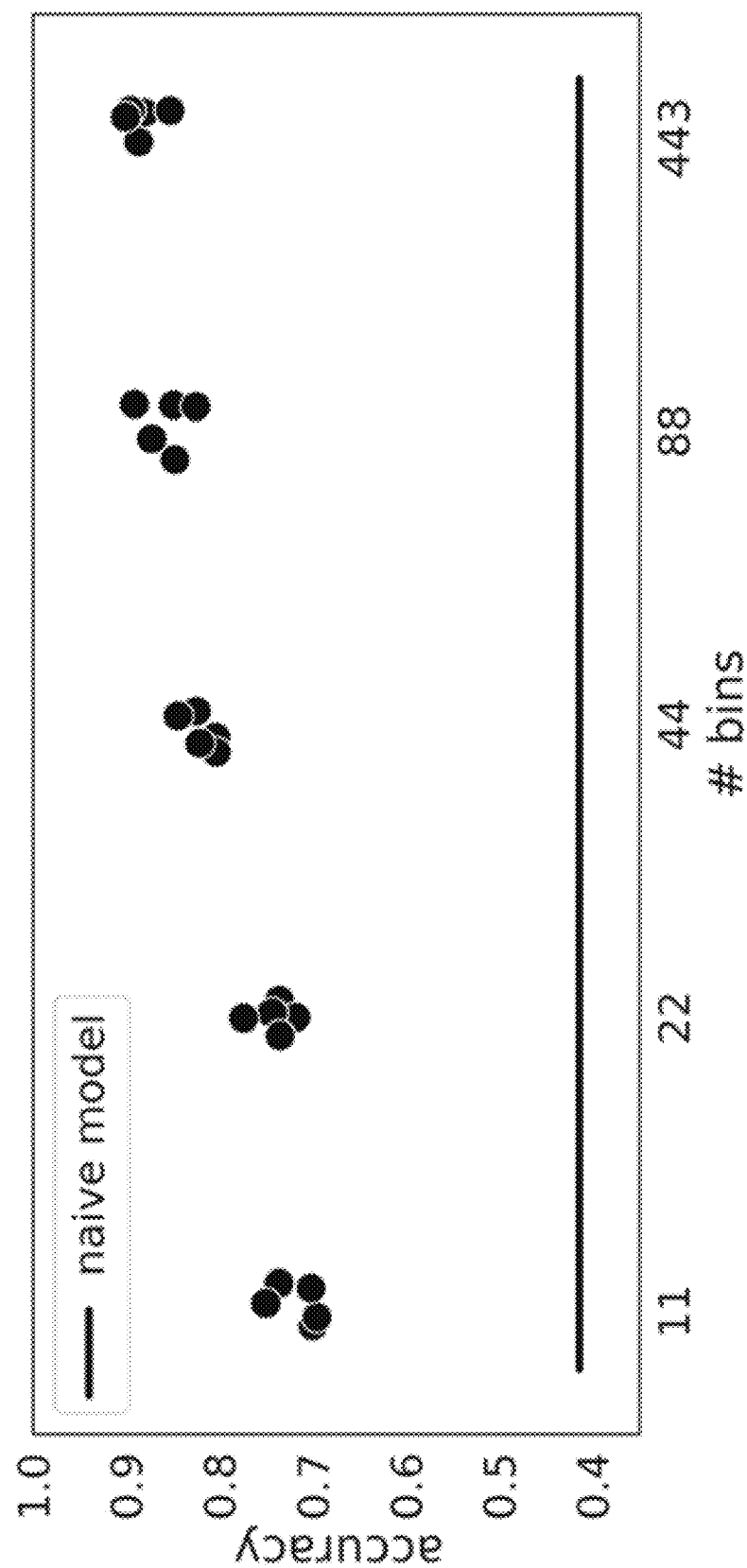

FIGS. 11A, 11B, 11C show confusion tables for: training and testing using all data (FIG. 11A), training using 2 cell lines and predicting the third (FIG. 11B) and training and testing with cells from the same cell line (FIG. 11C). FIG. 11D shows classification accuracy of an NN model with 5 units in the first hidden layer (with layer normalization and binary weights) on held-out test data when trained on spectra averaged within bins (=consecutive intervals) of equal size.

FIGS. 12A, 12B are tables illustrating features of neural network models. Neural network models visualized by the plot_model function from tensorflow. FIG. 12A shows Model A, used for classification of preprocessed spectra. FIG. 12B shows Model B, used for classification of raw spectra and optimal filter design by introducing a binarity constraint on the weights of the first hidden layer. An example with 5 units in the first hidden layer is shown.

| Cell type | Cell line | Rep | Date | Cells | Measurements |
|---|---|---|---|---|---|
| iPSC | 010S-1 | 1 | 181129 | 20 | 534 |
| iPSC | 010S-1 | 2 | 181130 | 20 | 495 |
| iPSC | 010S-1 | 3 | 181129 | 20 | 531 |
| iPSC | 014S-10 | 1 | 181129 | 20 | 424 |
| iPSC | 014S-10 | 2 | 181130 | 20 | 366 |
| iPSC | 014S-10 | 3 | 181130 | 20 | 327 |
| iPSC | SB-AD3-1 | 1 | 181129 | 20 | 437 |
| iPSC | SB-AD3-1 | 2 | 181129 | 20 | 389 |
| iPSC | SB-AD3-1 | 3 | 181130 | 20 | 347 |
| NSC | 010S-1 | 1 | 190117 | 20 | 358 |
| NSC | 010S-1 | 2 | 190117 | 20 | 322 |
| NSC | 010S-1 | 3 | 190117 | 20 | 299 |
| NSC | 014S-10 | 1 | 190117 | 20 | 259 |
| NSC | 014S-10 | 2 | 190117 | 16 | 203 |
| NSC | 014S-10 | 3 | 190305 | 20 | 235 |
| NSC | SB-AD3-1 | 1 | 190305 | 20 | 236 |
| NSC | SB-AD3-1 | 2 | 190305 | 20 | 217 |
| NSC | SB-AD3-1 | 3 | 190305 | 20 | 213 |
| Neuron | 010S-1 | 1 | 190305 | 20 | 316 |
| Neuron | 010S-1 | 2 | 190305 | 20 | 407 |
| Neuron | 010S-1 | 3 | 190305 | 20 | 405 |
| Neuron | 014S-10 | 1 | 190108 | 20 | 500 |
| Neuron | 014S-10 | 2 | 190108 | 20 | 394 |
| Neuron | 014S-10 | 3 | 190108 | 20 | 341 |
| Neuron | SB-AD3-1 | 1 | 190108 | 20 | 250 |
| Neuron | SB-AD3-1 | 2 | 190108 | 20 | 266 |
| Neuron | SB-AD3-1 | 3 | 190108 | 20 | 237 |

Table 1 shows a breakdown of data set used in the training.

The invention claimed is:

1. A method for Raman spectroscopy-based cell classification, the method comprising:
   a) performing a compressive Raman measurement of a cell sample; wherein performing the compressive Raman measurement comprises:
      i) performing laser microscopy of the cell sample to produce a collimated optical signal,
      ii) dispersing by a diffractive element the collimated optical signal to produce a dispersed optical signal,
      iii) frequency filtering the dispersed optical signal by a tunable optical filter that selects wavenumber intervals of the dispersed optical signal to produce a filtered signal,
      wherein a frequency response of the tunable optical filter is defined by weights; and
      iv) detecting by an optical detector the filtered signal to produce the compressive Raman measurement;
   b) repeating step (a) with different tunable optical filter weights to produce multiple compressive Raman measurements;
   c) processing the multiple compressive Raman measurements by a prediction neural network to predict a label of the cell sample;
   d) outputting the label of the cell sample for use for research purposes or quality control;
   wherein the tunable optical filter weights defining the frequency response of the tunable optical filter are derived from trained weights of a first hidden layer of a calibration phase neural network trained on training data comprising Raman spectra of cells and corresponding labels including cell type or cell health;
   wherein the prediction neural network is derived by removing an input layer and the weights of the first hidden layer from the calibration phase neural network while retaining biases of the first hidden layer and weights and biases of all subsequent layers of the calibration phase neural network.

2. The method of claim 1 wherein the calibration phase neural network is a multilayer perceptron neural network.

3. The method of claim 1 wherein the optical detector is a photomultiplier tube.

4. The method of claim 1 wherein the tunable optical filter is implemented using a spatial light modulator.

5. The method of claim 4 wherein the spatial light modulator is a digital micro-mirror device.

6. The method of claim 1 wherein the calibration phase neural network has a normalization layer after the first hidden layer.

7. The method of claim 1 wherein the calibration phase neural network trained on training data is pre-trained with a constraint that weights in the first hidden layer are non-negative, then further trained with a constraint that the weights in the first hidden layer are binary.

8. The method of claim 1 further comprising communicating the different tunable optical filter weights from a computer to the tunable optical filter.

9. The method of claim 1 further comprising communicating the multiple compressive Raman measurements from the optical detector to the prediction neural network.

10. The method of claim 1 wherein communicating the multiple compressive Raman measurements from the optical detector to the prediction neural network comprises transmitting the multiple compressive Raman measurements from the optical detector via a digital computer network to a cloud-based server.

11. The method of claim 1 wherein processing the multiple compressive Raman measurements by the prediction neural network to predict the label of the cell sample comprises inputting the multiple compressive Raman measurements to the prediction neural network, wherein the multiple compressive Raman measurements replace dot products of Raman spectra with the weights in the first hidden layer of the calibration phase neural network.

12. The method of claim 1 further comprising training the calibration phase neural network using training data comprising the Raman spectra and the corresponding labels; and communicating the trained weights of the first hidden layer of the calibration phase neural network to the tunable optical filter.

* * * * *